US011177494B2

(12) United States Patent
Hicks

(10) Patent No.: US 11,177,494 B2
(45) Date of Patent: Nov. 16, 2021

(54) SYSTEMS AND METHODS FOR FORMING A LIQUID MIXTURE HAVING A PREDETERMINED MIX RATIO AND REFORMING SYSTEMS, REFORMING METHODS, FUEL CELL SYSTEMS, AND FUEL CELL METHODS THAT UTILIZE THE LIQUID MIXTURE

(71) Applicant: H2 PowerTech, LLC, Bend, OR (US)

(72) Inventor: Michael Tyler Hicks, Bend, OR (US)

(73) Assignee: H2 PowerTech, LLC, Bend, OR (US)

( * ) Notice: Subject to any disclaimer, the term of this patent is extended or adjusted under 35 U.S.C. 154(b) by 517 days.

(21) Appl. No.: 15/912,151

(22) Filed: Mar. 5, 2018

(65) Prior Publication Data

US 2019/0273275 A1 Sep. 5, 2019

(51) Int. Cl.
*H01M 8/04746* (2016.01)
*G01F 1/00* (2006.01)
(Continued)

(52) U.S. Cl.
CPC ............. *H01M 8/0612* (2013.01); *C01B 3/34* (2013.01); *G01F 1/007* (2013.01); *G01F 23/14* (2013.01);
(Continued)

(58) Field of Classification Search
CPC ........... H01M 8/0612; H01M 8/04425; H01M 8/04776; C01B 3/34; G01F 1/007; G01F 23/14
See application file for complete search history.

(56) References Cited

U.S. PATENT DOCUMENTS 3,564,816 A 2/1971 Batta
3,960,295 A * 6/1976 Horak ................ B01F 15/0441 222/145.6

(Continued)

FOREIGN PATENT DOCUMENTS

EP 0145379 A2 6/1985
JP 2013-213788 10/2013
WO WO 93/06438 4/1993

OTHER PUBLICATIONS

English-language translation of JP 2013-213788, J-PlatPat, Jun. 30, 2017.

*Primary Examiner* — Christopher P Domone
*Assistant Examiner* — Kimberly Wyluda
(74) *Attorney, Agent, or Firm* — Dascenzo Gates Intellectual Property Law, P.C.

(57) ABSTRACT

Systems and methods for forming a liquid mixture having a predetermined mix ratio and reforming systems, reforming methods, fuel cell systems, and fuel cell methods that utilize the liquid mixture. The methods include apportioning a preselected volume of liquid from a liquid source. During the apportioning, the liquid is a first liquid, and the methods further include providing a first preselected volume of the first liquid to a mix tank. The methods also include repeating the apportioning with a second liquid providing a second preselected volume of the second liquid to the mix tank to generate the liquid mixture. The methods also may include providing the liquid mixture to a reforming region, reforming the liquid mixture to generate a mixed gas stream that includes hydrogen gas, and providing the hydrogen gas to a fuel cell assembly to generate an electric current.

24 Claims, 6 Drawing Sheets

(51) Int. Cl.

| | |
|---|---|
| ***G01F 23/14*** | (2006.01) |
| ***H01M 8/0612*** | (2016.01) |
| ***C01B 3/34*** | (2006.01) |
| ***H01M 8/0438*** | (2016.01) |

(52) U.S. Cl.

CPC ... *H01M 8/04425* (2013.01); *H01M 8/04776* (2013.01)

(56) References Cited

U.S. PATENT DOCUMENTS

| | | | |
|---|---|---|---|
| 3,986,849 A | 10/1976 | Fuderer et al. | |
| 4,331,455 A | 5/1982 | Sato | |
| 4,443,232 A | 4/1984 | Kaiser | |
| 5,001,924 A | 3/1991 | Walter et al. | |
| 5,441,559 A | 8/1995 | Petit et al. | |
| 5,861,137 A | 1/1999 | Edlund | |
| 5,997,594 A | 12/1999 | Edlund et al. | |
| 6,065,335 A * | 5/2000 | Denz | G01F 17/00 73/291 |
| 6,152,995 A | 11/2000 | Edlund | |
| 6,221,117 B1 | 4/2001 | Edlund et al. | |
| 6,319,306 B1 | 11/2001 | Edlund et al. | |
| 6,375,906 B1 | 4/2002 | Edlund et al. | |
| 6,383,670 B1 | 5/2002 | Edlund et al. | |
| 6,419,728 B1 | 7/2002 | Edlund | |
| 6,494,937 B1 | 12/2002 | Edlund et al. | |
| 6,497,856 B1 | 12/2002 | Lomax, Jr. et al. | |
| 6,537,352 B2 | 3/2003 | Edlund et al. | |
| 6,547,858 B1 | 4/2003 | Edlund et al. | |
| 6,562,111 B2 | 5/2003 | Edlund et al. | |
| 6,569,227 B2 | 5/2003 | Edlund et al. | |
| 6,692,545 B2 | 2/2004 | Gittleman et al. | |
| 6,723,156 B2 | 4/2004 | Edlund et al. | |
| 6,890,672 B2 | 5/2005 | Dickman et al. | |
| 7,005,206 B2 | 2/2006 | Lawrence et al. | |
| 7,160,367 B2 | 1/2007 | Babicki et al. | |
| 7,393,382 B2 | 7/2008 | Givens | |
| 7,399,342 B2 | 7/2008 | Bizjak | |
| 7,416,569 B2 | 8/2008 | Sumi et al. | |
| 7,494,534 B2 | 2/2009 | Fukagawa et al. | |
| 7,642,742 B2 | 1/2010 | Currello et al. | |
| 7,828,864 B2 | 11/2010 | Edlund et al. | |
| 7,837,765 B2 | 11/2010 | Adams et al. | |
| 7,972,420 B2 | 7/2011 | Pledger et al. | |
| 8,070,841 B2 | 12/2011 | Adams et al. | |
| 8,790,618 B2 | 7/2014 | Adams et al. | |
| 8,920,732 B2 | 12/2014 | Chen et al. | |
| 2001/0045061 A1 | 11/2001 | Edlund et al. | |
| 2002/0185176 A1 | 12/2002 | Leavitt et al. | |
| 2003/0192251 A1 | 10/2003 | Edlund et al. | |
| 2003/0223926 A1 | 12/2003 | Edlund et al. | |
| 2006/0204803 A1 | 9/2006 | Yamaguchi | |
| 2008/0138678 A1 | 6/2008 | Hill | |
| 2008/0248347 A1 | 10/2008 | Dickman et al. | |
| 2019/0127210 A1 * | 5/2019 | Thomas | B67D 7/048 |

* cited by examiner

SYSTEMS AND METHODS FOR FORMING A LIQUID MIXTURE HAVING A PREDETERMINED MIX RATIO AND REFORMING SYSTEMS, REFORMING METHODS, FUEL CELL SYSTEMS, AND FUEL CELL METHODS THAT UTILIZE THE LIQUID MIXTURE

FIELD OF THE DISCLOSURE

The present disclosure relates generally to systems and methods for forming a liquid mixture having a predetermined mix ratio and more specifically to such systems and methods that combine a first preselected volume of the first liquid and a second preselected volume of the second liquid to form the liquid mixture and/or to reforming systems, reforming methods, fuel cell systems, and/or fuel cell methods that utilize the liquid mixture.

BACKGROUND OF THE DISCLOSURE

In certain processes, it may be desirable, or even necessary, to form liquid mixtures that include precisely known volumes, masses, and/or amounts of the various components that are included in the liquid mixture. As an example, hydrogen-producing fuel-processing systems include a hydrogen-producing region that is adapted to convert one or more feedstocks into a product stream containing hydrogen gas as a majority component. The hydrogen-producing region may receive a feedstock stream that includes a mixture of an alcohol, such as methanol, and water, and convert the feedstock stream into a mixed gas stream that includes hydrogen gas and other gasses. In order to efficiently operate the hydrogen-producing fuel processing system, it may be necessary to accurately control the relative proportion of alcohol and water in the feedstock stream.

Many mechanisms exist for accurately measuring the volume, mass, and/or amount of two liquids prior to mixing the two liquids. However, these mechanisms generally require costly measurement equipment that must be calibrated on a regular schedule to minimize the potential for drift and/or errors. As an example, a scale may be utilized to accurately measure a mass of each component; however, accurate scales may be costly to obtain and will require regular calibration. As another example, a metering pump may be utilized to meter each component.

In certain circumstances, such as in fuel cell systems utilized for backup power applications, the cost of scales and/or other conventional measurement equipment may be prohibitive. In addition, these systems may be utilized in environments and/or locations where regular calibration may be impractical and/or may add unacceptable additional system operating costs. Thus, there exists a need for improved systems and methods for forming a liquid mixture having a predetermined mix ratio and/or for reforming systems, reforming methods, fuel cell systems, and/or fuel cell methods that utilize the liquid mixture.

SUMMARY OF THE DISCLOSURE

Systems and methods for forming a liquid mixture having a predetermined mix ratio and reforming systems, reforming methods, fuel cell systems, and fuel cell methods that utilize the liquid mixture. The methods include apportioning a preselected volume of liquid from a liquid source. The apportioning includes dispensing the liquid from the liquid source into a containment volume and monitoring a pressure of the liquid within the containment volume as a function of time. The apportioning also includes automatically discharging an overflow stream from the containment volume when a volume of liquid within the containment volume equals the preselected volume, detecting a transition region in the pressure, and ceasing the dispensing the liquid responsive to the detecting. During the apportioning, the liquid is a first liquid, and the methods further include providing a first preselected volume of the first liquid to a mix tank. The methods also include repeating the apportioning. During the repeating, the liquid is a second liquid, and the methods further include providing a second preselected volume of the second liquid to the mix tank to generate the liquid mixture.

The methods also may include providing the liquid mixture to a reforming region and reforming the liquid mixture to generate a mixed gas stream that includes hydrogen gas and other gasses. The methods may include increasing the purity of the hydrogen gas in the mixed gas stream and/or removing at least a portion of the other gasses from the mixed gas stream. The methods further may include providing the hydrogen gas to an anode of a fuel cell assembly, providing an oxidant to a cathode of the fuel cell assembly, and reacting the hydrogen gas and the oxidant, within the fuel cell assembly, to generate an electric current. The systems include systems that perform the methods.

DETAILED DESCRIPTION AND BEST MODE OF THE DISCLOSURE

Figure 1:
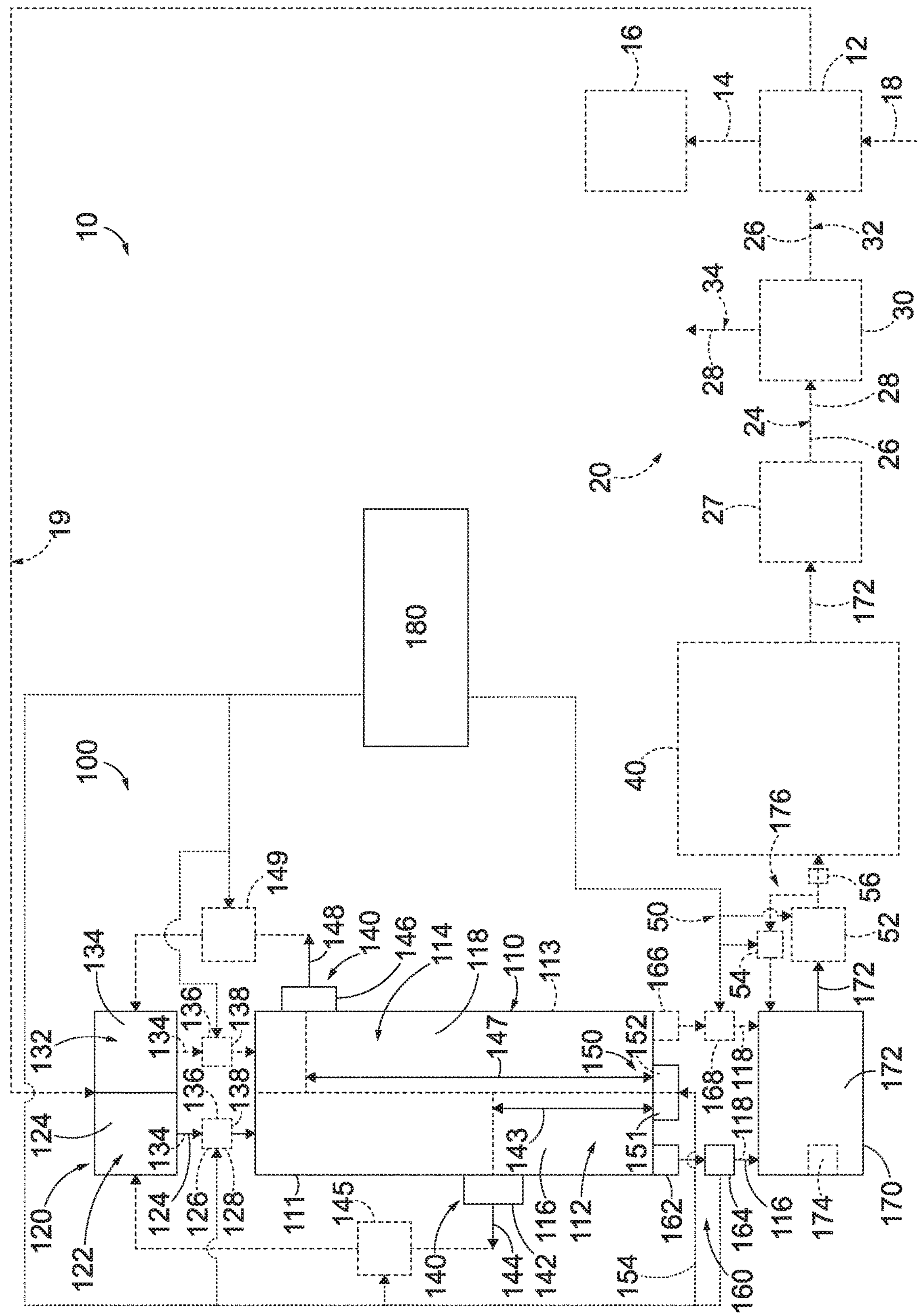
FIG. 1 is a schematic illustration of examples of a liquid mixing system that may form a portion of a fuel processing system and/or of a fuel cell system, according to the present disclosure.

FIGS. 1-7 provide examples of liquid mixing systems 100, of fuel processing systems 20 that include liquid mixing systems 100, of fuel cell systems 10 that include fuel processing systems 20, and/or of methods 200/300/400, according to the present disclosure. Elements that serve a similar, or at least substantially similar, purpose are labeled with like numbers in each of FIGS. 1-7, and these elements may not be discussed in detail herein with reference to each of FIGS. 1-7. Similarly, all elements may not be labeled in each of FIGS. 1-7, but reference numerals associated therewith may be utilized herein for consistency. Elements, components, and/or features that are discussed herein with reference to one or more of FIGS. 1-7 may be included in and/or utilized with any of FIGS. 1-7 without departing from the scope of the present disclosure. In general, elements that are likely to be included in a particular embodiment are illustrated in solid lines, while elements that are optional are illustrated in dashed lines. However, elements that are shown in solid lines may not be essential and, in some embodiments, may be omitted without departing from the scope of the present disclosure.

Figure 2:
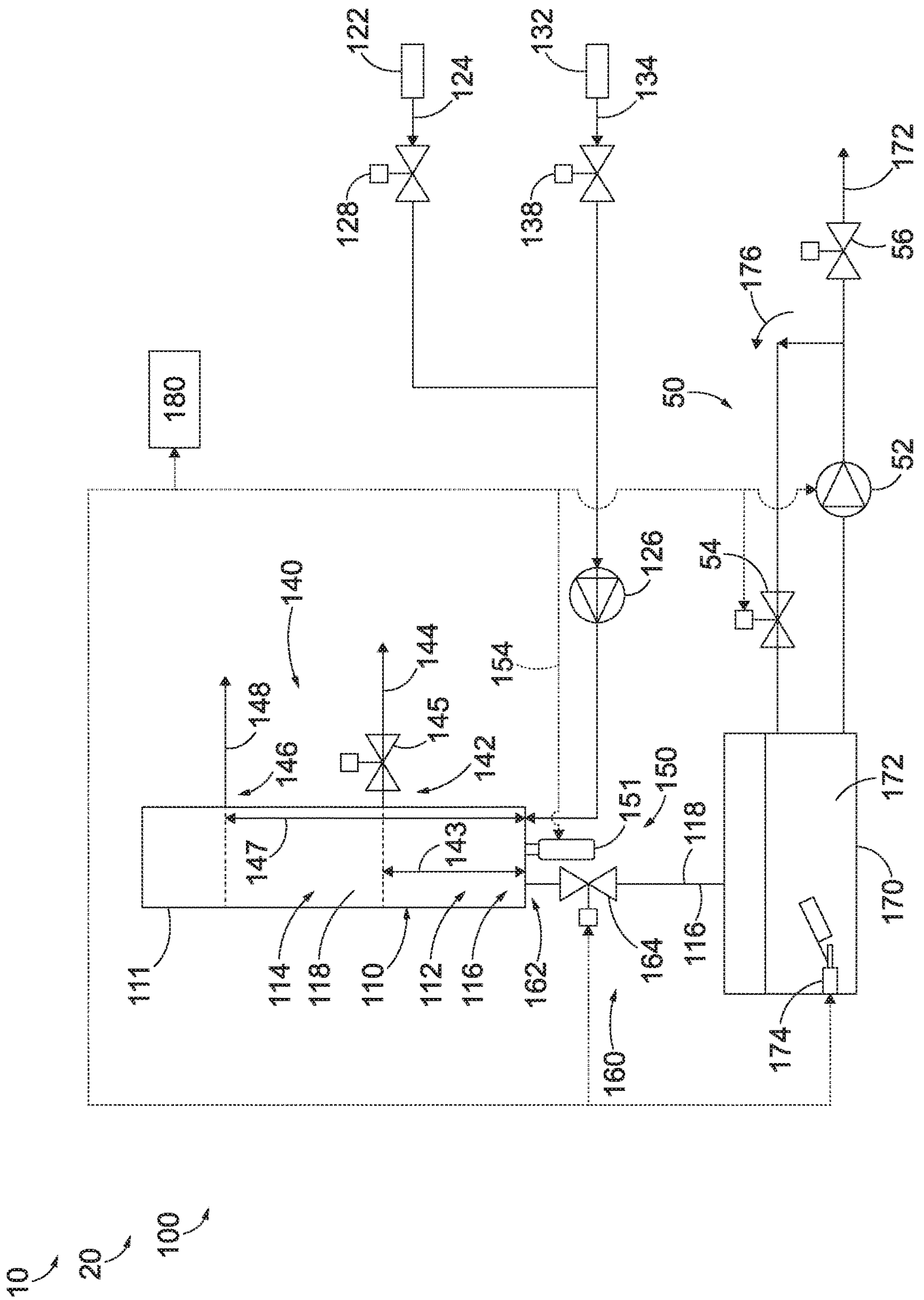
FIG. 2 is a less schematic illustration of an example of a liquid mixing system according to the present disclosure.
Figure 3:
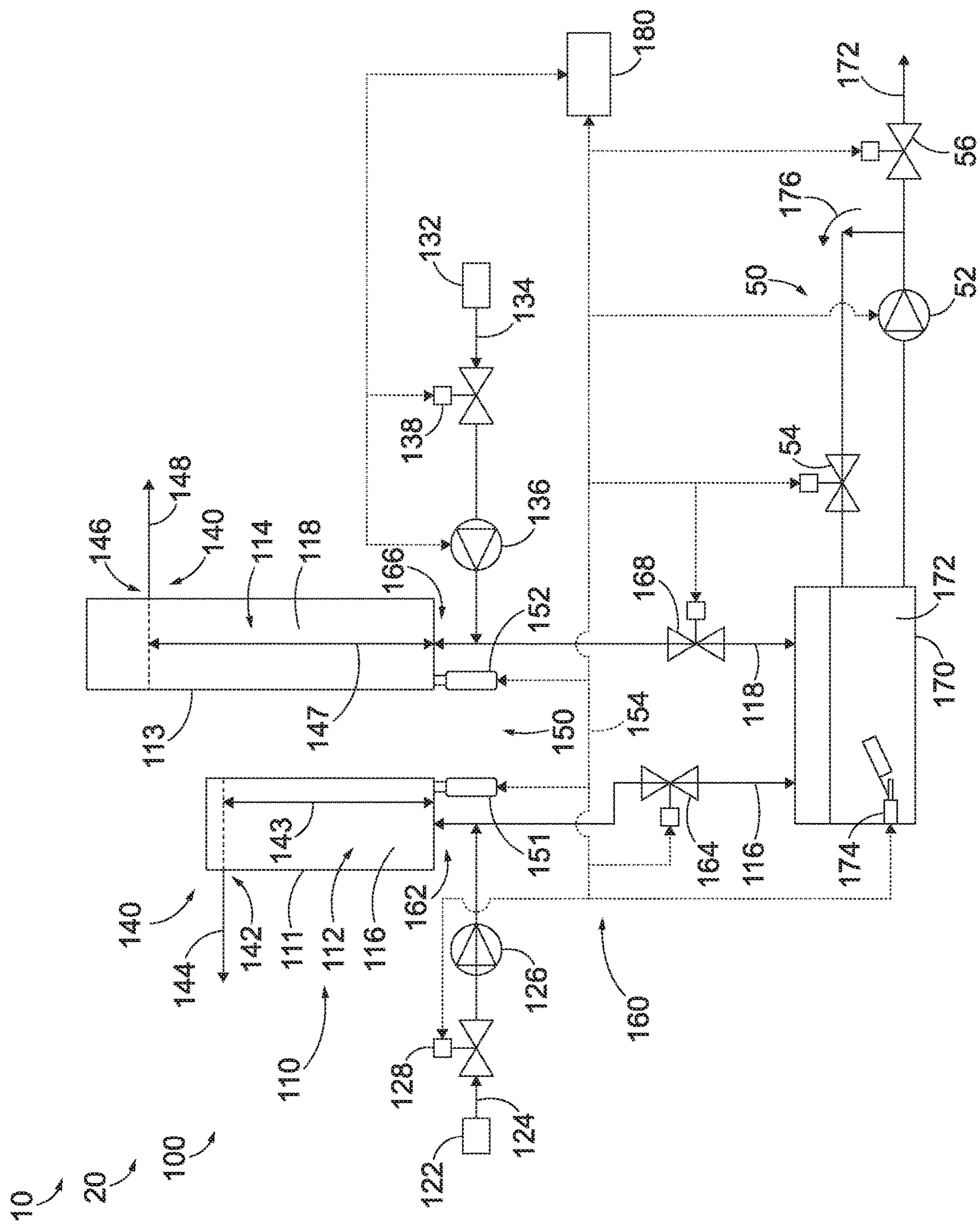
FIG. 3 is a less schematic illustration of an example of a liquid mixing system according to the present disclosure.

FIG. 1 is a schematic illustration of examples of a liquid mixing system 100 that may form a portion of a fuel processing system 20 and/or of a fuel cell system 10, according to the present disclosure. FIG. 2 is a less schematic illustration of an example of a liquid mixing system 100 according to the present disclosure, and FIG. 3 is another less schematic illustration of an example of a liquid mixing system 100 according to the present disclosure.

Liquid mixing systems 100 are configured to mix a first liquid 124 and a second liquid 134 at a predetermined mix ratio and include a containment structure 110 that defines a first containment volume 112 and a second containment volume 114. First containment volume 112 is configured to receive first liquid 124, such as from a liquid source 120, as illustrated in FIG. 1. Second containment volume 114 is configured to receive second liquid 134, such as from liquid source 120, as illustrated in FIG. 1. Liquid source 120 may include a first liquid source 122 that contains first liquid 124 and a separate, distinct, and/or spaced-apart second liquid source 132 that contains second liquid 134.

Liquid mixing systems 100 also include an overflow structure 140. Overflow structure 140 includes a first overflow port 142, which extends from first containment volume 112, and a second overflow port 146, which extends from second containment volume 114. First overflow port 142 is positioned, within first containment volume 112, to emit a first overflow stream 144 from the first containment volume when a first liquid level 143 of first liquid 124 within first containment volume 112 equals, or exceeds, a first preselected volume 116. Similarly, second overflow port 146 is positioned, within second containment volume 114, to emit a second overflow stream 148 from the second containment volume when a second liquid level 147 of second liquid 134 within second containment volume 114 equals, or exceeds, a second preselected volume 118.

Liquid mixing systems 100 also include a pressure detection structure 150. As discussed in more detail herein, pressure detection structure 150 is configured to measure a first pressure of the first liquid as a function of time within first containment volume 112 and also to measure a second pressure of the second liquid as a function of time within second containment volume 114.

Liquid mixing systems 100 further include a mix tank 170. Mix tank 170 is configured to receive first preselected volume 116 of the first liquid, such as from first containment volume 112, and second preselected volume 118 of the second liquid, such as from second containment volume 114, to form and/or define a liquid mixture 172 that includes the first liquid and the second liquid at the predetermined mix ratio. As illustrated in dashed lines in FIG. 1 and in solid lines in FIGS. 2-3, mix tank 170 may include a level detector 174. Level detector 174, when present, may be configured to detect and/or to determine a liquid level within mix tank 170.

Liquid mixing systems 100 also include an outlet structure 160. Outlet structure 160 is configured to provide first preselected volume 116 and second preselected volume 118 to mix tank 170.

Liquid mixing systems 100 further include a controller 180. Controller 180 is adapted configured, designed, and/or programmed to control the operation of one or more components of liquid mixing system 100. This may include controlling the operation of the one or more components according to any suitable step and/or steps of any of methods 200, 300, and/or 400, which are discussed in more detail herein.

Containment structure 110 may include a single containment body 111 that defines both first containment volume 112 and second containment volume 114, as illustrated in solid lines in FIGS. 1-2. Alternatively, liquid mixing systems 100 may include two separate, distinct, and/or spaced-apart containment bodies 111 and 113 that separately define first containment volume 112 and second containment volume 114, as illustrated schematically by the vertical dashed line separating first containment volume 112 and second containment volume 114 in FIG. 1 and as illustrated by the two distinct containment bodies 111 and 113 separately defining the first containment volume and the second containment volume in FIG. 3.

Turning now to FIGS. 1-2, in liquid mixing systems 100 that include a containment structure 110 including a single containment body 111 that defines both first containment volume 112 and second containment volume 114, first overflow port 142 and second over flow port 146 both may extend at different heights from the single containment body 111. In this example, pressure detection structure 150 may include a single, or a first, pressure detector 151, which may be positioned within a lower region of containment body 111 and/or which may be configured to detect liquid pressure within the lower region of containment body 111.

In addition, the liquid mixing systems may include a first overflow stream control device 145, an example of which includes a first overflow stream control valve, which may be associated with first overflow port 142 and/or may be configured to selectively restrict, and to selectively permit, fluid flow through the first overflow port. During operation of such liquid mixing systems 100, containment body 111 sequentially may be filled with first liquid 124 and second liquid 134 in any suitable order to sequentially form, define, and/or apportion first preselected volume 116 and second preselected volume 118, respectively.

To apportion first preselected volume 116 of first liquid 124 from first liquid source 122, first overflow stream control device 145 initially may be in an open state and/or may be configured to permit fluid flow through first overflow port 142; and containment body 111 initially may be empty, or at least substantially empty. Under these conditions, first pressure detector 151 may produce and/or generate a constant, or an at least substantially constant, output signal 154 as a function of time, such as is illustrated between time $t_0$ and time $t_1$ in FIG. 4.

Subsequently, first liquid 124 may be provided to containment structure 110, and/or to containment body 111 thereof, thereby increasing first liquid level 143 within the containment body. This increase in first liquid level 143 will produce a corresponding change, increase, and/or monotonic increase, in output signal 154 of first pressure detector 151 as a function of time, as illustrated between time $t_1$ and time $t_2$ in FIG. 4.

Figure 4:
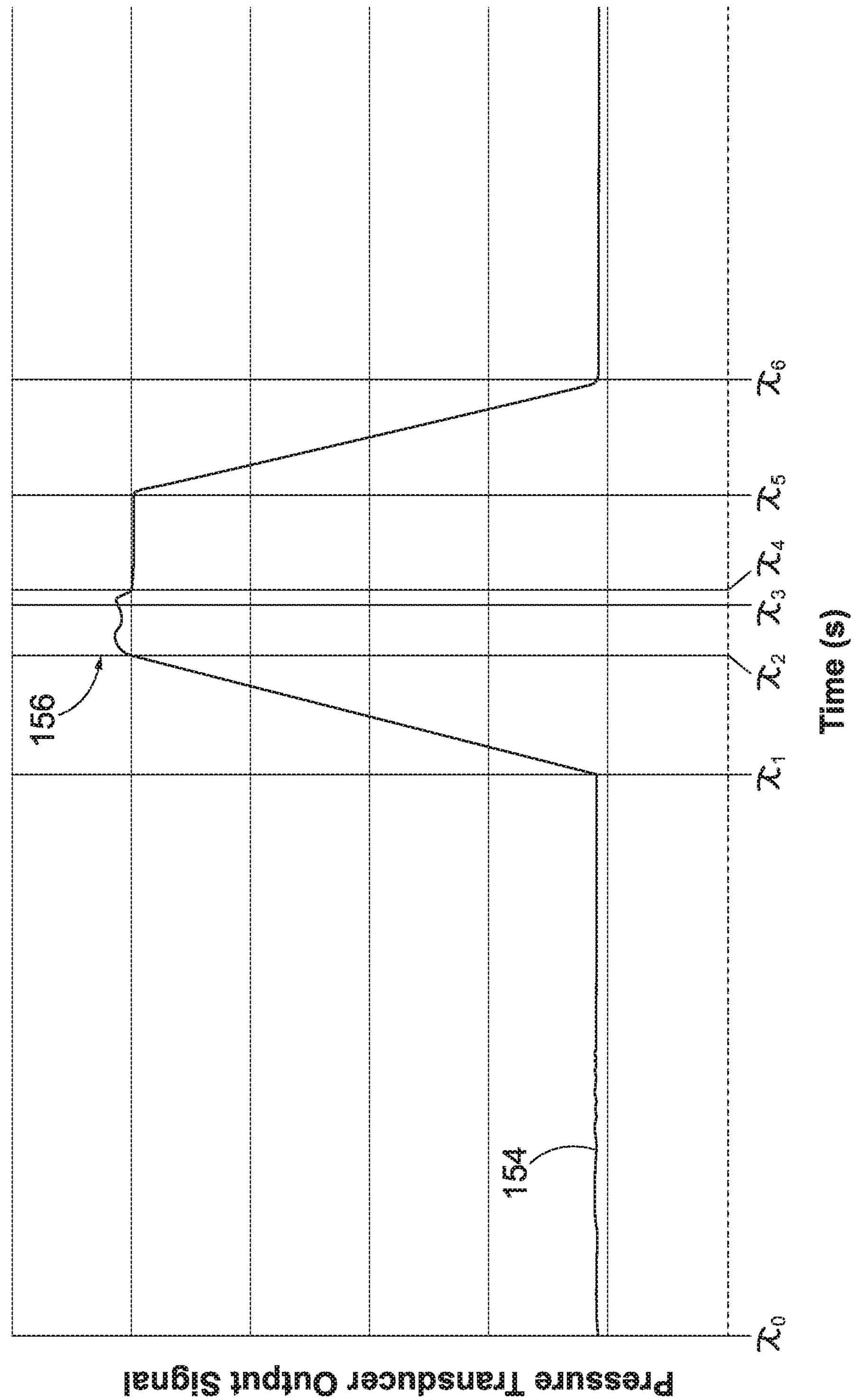
FIG. 4 is a pressure vs. time trace that may be generated by the systems and methods according to the present disclosure.

When first liquid level 143 reaches first overflow port 142, first overflow stream 144 may flow, or automatically may flow, from the first overflow port. This may cause output signal 154 of first pressure detector 151 to stop increasing, to stop increasing monotonically, to exhibit a local maxima, to exhibit an instability, and/or to exhibit a discontinuity, and is illustrated in FIG. 4 by the transition from the behavior between time $t_1$ and time $t_2$ to the behavior between time $t_2$ and time $t_3$. This transition may be referred to herein as a transition region 156, or, in the context of the apportioning the first liquid, a first transition region (i.e., any volume of first liquid that exceeds the first preselected volume). As used herein, the term "discontinuity" may refer to a readily observable change in the behavior and/or slope of the pressure as the function of time.

Upon detection of transition region 156, liquid mixing system 100 may cease providing first liquid 124 to containment body 111. This may permit any residual first liquid within the containment body (i.e., any volume of first liquid that exceeds the first preselected volume) to drain from first overflow port 142. As the residual first liquid drains from the overflow port, output signal 154 of first pressure detector 151 initially may decrease, as illustrated in FIG. 4 between time $t_3$ and time $t_4$ and then may stabilize, may become constant, and/or may become at least substantially constant, as illustrated in FIG. 4 between time $t_4$ and time $t_5$.

Once the output signal has stabilized, a first outlet flow control device 164 of outlet structure 160 may be opened, thereby permitting first preselected volume 116 of first liquid 124 to flow from containment body 111, such as via an outlet port 162, and into mix tank 170. This may cause a decrease in first liquid level 143, which will produce a corresponding change, decrease, and/or monotonic decrease in output signal 154 of first pressure detector 151, as illustrated in FIG. 4 between time $t_5$ and time $t_6$. When the first liquid ceases flowing through the outlet port and/or into the mix tank, output signal 154 may stabilize and/or become constant, as illustrated in FIG. 4 for times greater than time $t_6$.

To apportion second preselected volume 118 of second liquid 134 from second liquid source 132, first overflow stream control device 145 of FIGS. 1-2 initially may be in a closed state and/or may be configured to resist fluid flow through first overflow port 142; and containment body 111 initially may be empty, or at least substantially empty. Under these conditions, first pressure detector 151 may produce and/or generate a constant, or an at least substantially constant, output signal 154 as a function of time, such as is once again illustrated between time $t_0$ and time $t_1$ in FIG. 4.

Subsequently, second liquid 134 may be provided to containment structure 110, and/or to containment body 111 thereof, thereby increasing second liquid level 147 within the containment body. This increase in second liquid level 147 will produce a corresponding change, increase, and/or monotonic increase, in output signal 154 of first pressure detector 151 as a function of time, as is once again illustrated between time $t_1$ and time $t_2$ in FIG. 4.

When second liquid level 147 reaches second overflow port 146, second overflow stream 148 may flow, or automatically may flow, from the second overflow port. This may cause output signal 154 of first pressure detector 151 to stop increasing, to stop increasing monotonically, to exhibit a local maxima, to exhibit an instability, and/or to exhibit a discontinuity, and is once again illustrated in FIG. 4 by the transition from the behavior between time $t_1$ and time $t_2$ to the behavior between time $t_2$ and time $t_3$. As discussed, this transition may be referred to herein as a transition region 156, or, in the context of the apportioning of the second liquid, as a second transition region.

Upon detection of transition region 156, liquid mixing system 100 may cease providing second liquid 134 to containment body 111. This may permit any residual second liquid within the containment body to drain from second overflow port 146. As the residual second liquid drains from the second overflow port, output signal 154 of first pressure detector 151 initially may decrease, as illustrated in FIG. 4 between time $t_3$ and time $t_4$ and then may stabilize, may become constant, and/or may become at least substantially constant, as illustrated in FIG. 4 between time $t_4$ and time $t_5$.

Once the output signal has stabilized, outlet flow control device 164 of outlet structure 160 may be opened, thereby permitting second preselected volume 118 of second liquid 134 to flow from containment body 111, such as via outlet port 162, and into mix tank 170. This may cause a decrease in second liquid level 147, which will produce a corresponding change, decrease, and/or monotonic decrease in output signal 154 of first pressure detector 151, as once again illustrated in FIG. 4 between time $t_5$ and time $t_6$. When the second liquid ceases flowing through the outlet port and/or into the mix tank, output signal 154 may stabilize and/or become constant, as once again illustrated in FIG. 4 for times greater than time $t_6$.

Turning now to FIGS. 1 and 3, in liquid mixing systems 100 that include a containment structure 110 including one, or a first, containment body 111 that defines first containment volume 112 and another, or a second, containment body 113 that defines second containment volume 114, first overflow port 142 may extend from first containment body 111 and second overflow port 146 may extend from second containment body 113. In this example, pressure detection structure 150 may include two pressure detectors 151/152, which may be referred to herein as a first pressure detector 151 and a second pressure detector 152. First pressure detector 151 may be positioned within a lower region of containment body 111 and/or may be configured to detect liquid pressure within the lower region of containment body 111. Second pressure detector 152 may be positioned within a lower region of containment body 113 and/or may be configured to detect liquid pressure within the lower region of containment body 113.

To apportion first preselected volume 116 of first liquid 124 from first liquid source 122, first liquid 124 may be provided to containment structure 110, and/or to containment body 111 thereof, thereby increasing first liquid level 143 within the containment body. This increase in first liquid level 143 will produce a corresponding change, increase, and/or monotonic increase, in output signal 154 of second pressure detector 152 as a function of time, as is once again illustrated between time $t_1$ and time $t_2$ in FIG. 4.

When first liquid level 143 reaches first overflow port 142, first overflow stream 144 may flow, or automatically may flow, from the first overflow port. This may cause output signal 154 of second pressure detector 152 to exhibit transition region 156, as illustrated in FIG. 4 and discussed herein.

Upon detection of transition region 156, liquid mixing system 100 may cease providing first liquid 124 to containment body 111. This may permit any residual first liquid within the containment body to drain from first overflow port 142. As the residual first liquid drains from the overflow port, output signal 154 of second pressure detector 152 initially may decrease, as once again illustrated in FIG. 4 between time $t_3$ and time $t_4$ and then may stabilize, may become constant, and/or may become at least substantially constant, as once again illustrated in FIG. 4 between time $t_4$ and time $t_5$.

Once the output signal has stabilized, a first outlet flow control device 164 of outlet structure 160 may be opened, thereby permitting first preselected volume 116 of first liquid 124 to flow from containment body 111, such as via a first outlet port 162, and into mix tank 170. This may cause a decrease in first liquid level 143, which will produce a corresponding change, decrease, and/or monotonic decrease in output signal 154 of second pressure detector 152, as once again illustrated in FIG. 4 between time $t_5$ and time $t_6$. When the first liquid ceases flowing through the outlet port and/or into the mix tank, output signal 154 may stabilize and/or become constant, as once again illustrated in FIG. 4 for times greater than time $t_6$. Outlet flow control device 164 also may be referred to herein as a first outlet flow control device 164, and outlet port 162 also may be referred to herein as a first outlet port 162.

To apportion second preselected volume 118 of second liquid 134 from second liquid source 132, second liquid 134 may be provided to containment structure 110, and/or to containment body 113 thereof, thereby increasing second liquid level 147 within the containment body. This increase in second liquid level 147 will produce a corresponding change, increase, and/or monotonic increase, in output signal 154 of second pressure detector 152 as a function of time, as is once again illustrated between time $t_1$ and time $t_2$ in FIG. 4.

When second liquid level 147 reaches second overflow port 146, second overflow stream 148 may flow, or automatically may flow, from the second overflow port. This may cause output signal 154 of second pressure detector 152 to exhibit transition region 156.

Upon detection of transition region 156, liquid mixing system 100 may cease providing second liquid 134 to containment body 113. This may permit any residual second liquid within the containment body to drain from second overflow port 146. As the residual second liquid drains from the second overflow port, output signal 154 of second pressure detector 152 initially may decrease, as once again illustrated in FIG. 4 between time $t_3$ and time $t_4$ and then may stabilize, may become constant, and/or may become at least substantially constant, as once again illustrated in FIG. 4 between time $t_4$ and time $t_5$.

Once the output signal has stabilized, outlet flow control device 168, which also may be referred to herein as a second outlet flow control device 168, of outlet structure 160 may be opened, thereby permitting second preselected volume 118 of second liquid 134 to flow from containment body 113, such as via outlet port 166, and into mix tank 170. This may cause a decrease in second liquid level 147, which will produce a corresponding change, decrease, and/or monotonic decrease in output signal 154 of second pressure detector 152, as once again illustrated in FIG. 4 between time $t_5$ and time $t_6$. When the second liquid ceases flowing through the second outlet port and/or into the mix tank, output signal 154 may stabilize and/or become constant, as once again illustrated in FIG. 4 for times greater than time $t_6$. Outlet flow control device 168 also may be referred to herein as a second outlet flow control device 168, and outlet port 166 also may be referred to herein as a second outlet port 168.

The above-described configurations for liquid mixing system 100 may provide an accurate and/or reproducible first preselected volume 116 of the first liquid, with the first preselected volume being defined by a cross-sectional diameter of containment body 111 and a height distance between first outlet port 162 and first overflow port 142. Similarly, these configurations may provide an accurate and/or reproducible second preselected volume 118 of the second liquid, with the second preselected volume being defined by the cross-sectional diameter of containment body 111/113 and a height distance between outlet port 162/166 and second overflow port 146. In addition, this accurate determination of the first preselected volume and/or of the second preselected volume may be monitored by an uncalibrated pressure detector 151/152, since only the changes in pressure are utilized to apportion the first preselected volume into the containment body.

Controller 180 may include and/or be any suitable structure, device, and/or devices that may be adapted, configured, designed, constructed, and/or programmed to perform the functions discussed herein. As examples, controller 180 may include one or more of an electronic controller, a dedicated controller, a special-purpose controller, a personal computer, a special-purpose computer, a display device, a logic device, a memory device, and/or a memory device having computer-readable storage media.

The computer-readable storage media, when present, also may be referred to herein as and/or may be non-transitory computer readable storage media. This non-transitory computer readable storage media may include, define, house, and/or store computer-executable instructions, programs, and/or code; and these computer-executable instructions may direct liquid mixing system 100 and/or controller 180 thereof to perform any suitable portion, or subset, of methods 200/300/400. Examples of such non-transitory computer-readable storage media include CD-ROMs, disks, hard drives, flash memory, etc. As used herein, storage, or memory, devices and/or media having computer-executable instructions, as well as computer-implemented methods and other methods according to the present disclosure, are considered to be within the scope of subject matter deemed patentable in accordance with Section 101 of Title 35 of the United States Code.

Containment volumes 112/114 may include and/or be any suitable volume that contains first liquid 124 and second liquid 134, respectively. As examples, and as illustrated, containment volumes 112/114 may include and/or be elongate containment volumes and/or cylindrical containment volumes. As another example, containment volumes 112/114 may define a height and a maximum horizontal extent, with the maximum horizontal extent being measured perpendicular to the height. Under these conditions, a ratio of the height to the maximum horizontal extent may be at least 2, at least 4, at least 6, at least 8, at least 10, at most 30, at most 25, at most 20, at most 15, at most 10, and/or at most 5. Such a configuration may increase an accuracy and/or reproducibility of first preselected volume 116 and/or second preselected volume 118 that may be apportioned by liquid mixing system 100. Examples of the maximum horizontal extent include maximum horizontal extents of at least 4 centimeters (cm), at least 6 cm, at least 8 cm, at least 10 cm, at least 12 cm, at least 14 cm, at least 16 cm, at most 30 cm, at most 25 cm, at most 20 cm, at most 18 cm, at most 16 cm, at most 14 cm, at most 12 cm, and/or at most 10 cm.

As illustrated in dashed lines in FIG. 1 and in solid lines in FIGS. 2-3, liquid mixing system 100 may include a recirculation system 50. Recirculation system 50, when present, may be configured to recirculate liquid mixture 172 within mix tank 170, such as to permit and/or facilitate complete, thorough, and/or a desired level of mixing of the liquid mixture. This may be accomplished in any suitable manner. As an example, recirculation system 50 may include a recirculation pump 52, a recirculation valve 54, and a liquid mixture flow control valve 56. The components of recirculation system 50 may be configured such that recirculation pump 52 pumps liquid mixture 172 from mix tank 170. When recirculation valve 54 is open and liquid mixture flow control valve 56 is closed, liquid mixture 172 may be pumped in a closed loop 176 that returns the liquid mixture to the mix tank, thereby mixing the liquid mixture within the mix tank. In contrast, when recirculation valve 54 is closed and liquid mixture flow control valve 56 is open, liquid mixture 172 may be pumped from mix tank 170 and to a downstream device, such as to a storage tank 40, and/or to fuel processing system 20, examples of which are disclosed herein.

Liquid source 120 may include any suitable structure and/or structures that may be adapted, configured, designed, and/or constructed to provide first liquid 124 from first liquid source 122 to first containment volume 112 and/or to provide second liquid 134 from second liquid source 132 to second containment volume 114. When a single containment body 111 defines both first containment volume 112 and second containment volume 114, and as illustrated in FIGS. 1-2, liquid source 120 may include a liquid pump 126, a first liquid valve 128, and a second liquid valve 138. First liquid valve 128 and second liquid valve 138 may be configured to be selectively actuated to permit liquid pump 126 to selectively pump first liquid 124 and/or second liquid 134 to and/or into containment body 111.

When separate containment bodies 111/113 define first containment volume 112 and second containment volume 114, respectively, and as illustrated in FIGS. 1 and 3, liquid source 120 may include two liquid pumps 126/136 as well as first liquid valve 128 and second liquid valve 138. Liquid pumps 126/136 also may be referred to herein as a first liquid pump 126 and a second liquid pump 136. In this configuration, first liquid pump 126 and/or first liquid valve 128 may be utilized to selectively pump first liquid 124 to and/or into containment body 111. Similarly, second liquid pump 136 and/or second liquid valve 138 may be utilized to selectively pump second liquid 134 to and/or into containment body 113.

As illustrated in dashed lines in FIG. 1, liquid mixing system 100 may be configured such that first overflow stream 144 is returned to first liquid source 122. As an example, first overflow stream control device 145 may include a first overflow stream pump that pumps the first overflow stream into the first liquid source. As another example, the first overflow stream may be configured to gravity feed into the first liquid source.

Similarly, liquid mixing system 100 may be configured such that second overflow stream 148 is returned to second liquid source 132. As an example, a second overflow stream control device 149 may include a second overflow stream pump that pumps the second overflow stream into the second liquid source. As another example, the second overflow stream may be configured to gravity feed into the second liquid source. It also is within the scope of the present disclosure that the first and/or second overflow streams are not returned to the respective first and/or second liquid sources.

As illustrated in dashed lines in FIG. 1, liquid mixing system 100 may include and/or be in fluid communication with storage tank 40. Storage tank 40, when present, may be configured to receive liquid mixture 172 from mix tank 170 and/or to store the liquid mixture, such as for future use by a downstream structure, such as fuel processing system 20.

As also illustrated in dashed lines in FIG. 1, liquid mixing system 100 may include, may be included in, and/or may be utilized with fuel processing system 20. Fuel processing system 20, when present, may include a fuel processor 22 configured to receive liquid mixture 172 from liquid mixing system 100 and to reform the liquid mixture to produce and/or generate a mixed gas stream 24. Mixed gas stream 24 may include hydrogen gas 26 and other gasses 28. Examples of fuel processor 22 include a reformer, an autothermal reformer, and/or a steam reformer. Additional examples of fuel processing systems and/or of fuel processors are disclosed in U.S. Pat. Nos. 6,221,117, 5,997,594, 5,861,137, and in U.S. Patent Application Publication Nos. 2001/0045061, 2003/0192251, and 2003/0223926, the complete disclosures of which are hereby incorporated by reference.

In certain applications, it may be desirable to separate hydrogen gas 26 of mixed gas stream 24 from other gasses 28. In such applications, fuel processing system 20 also may include a purification assembly 30. Purification assembly 30, when present, may be configured to separate mixed gas stream 24 into a product hydrogen stream 32 and a byproduct stream 34. Product hydrogen stream 32 may include pure, or at least substantially pure, hydrogen gas 26. Byproduct stream 34 may include other gasses 28. Examples of purification assembly 30 include a membrane purification assembly and/or a pressure swing adsorption assembly. Additional examples of membrane purification assemblies are disclosed in U.S. Pat. Nos. 5,997,594, 6,152,995, 6,221,117, 6,319,306, 6,419,728, 6,494,937, 6,537,352, 6,547,858, 6,562,111, 6,569,227, 6,723,156, and 7,972,420 and U.S. Patent Application Publication No. 2008/0138678. Additional examples of pressure swing adsorption assemblies are disclosed in U.S. Pat. Nos. 3,564,816, 3,986,849, 4,331,455, 5,441,559, 6,497,856, 6,692,545, 7,160,367, 7,393,382, 7,399,342, 7,416,569, 7,837,765, 8,070,841, and 8,790,618, the complete disclosures of which are hereby incorporated by reference.

As illustrated in dashed lines in FIG. 1, liquid mixing system 100 and/or fuel processing system 20 may include, may be included in, and/or may be utilized with a fuel cell system 10. Fuel cell system 10 may include a fuel cell 12 configured to receive hydrogen gas 26, such as from product hydrogen stream 32, and an oxidant 18 and to generate an electric current 14 therefrom. Electric current 14 may be utilized to power and/or to satisfy an applied load 16.

As further illustrated in dashed lines in FIG. 1, fuel cell system 10 may produce and/or generate water 19 during generation of electric current 14. As discussed in more detail herein, first liquid 124 or second liquid 134 may include, or be, water. Under these conditions, water 19 may be provided to liquid source 120, such as to decrease an overall water consumption of fuel cell system 10 and/or to make fuel cell system 10 water-neutral, or at least substantially water-neutral. A water-neutral fuel cell system 10 produces at least as much water as it consumes to produce the hydrogen gas utilized by the fuel cell system to generate electric current 14.

Figure 5:
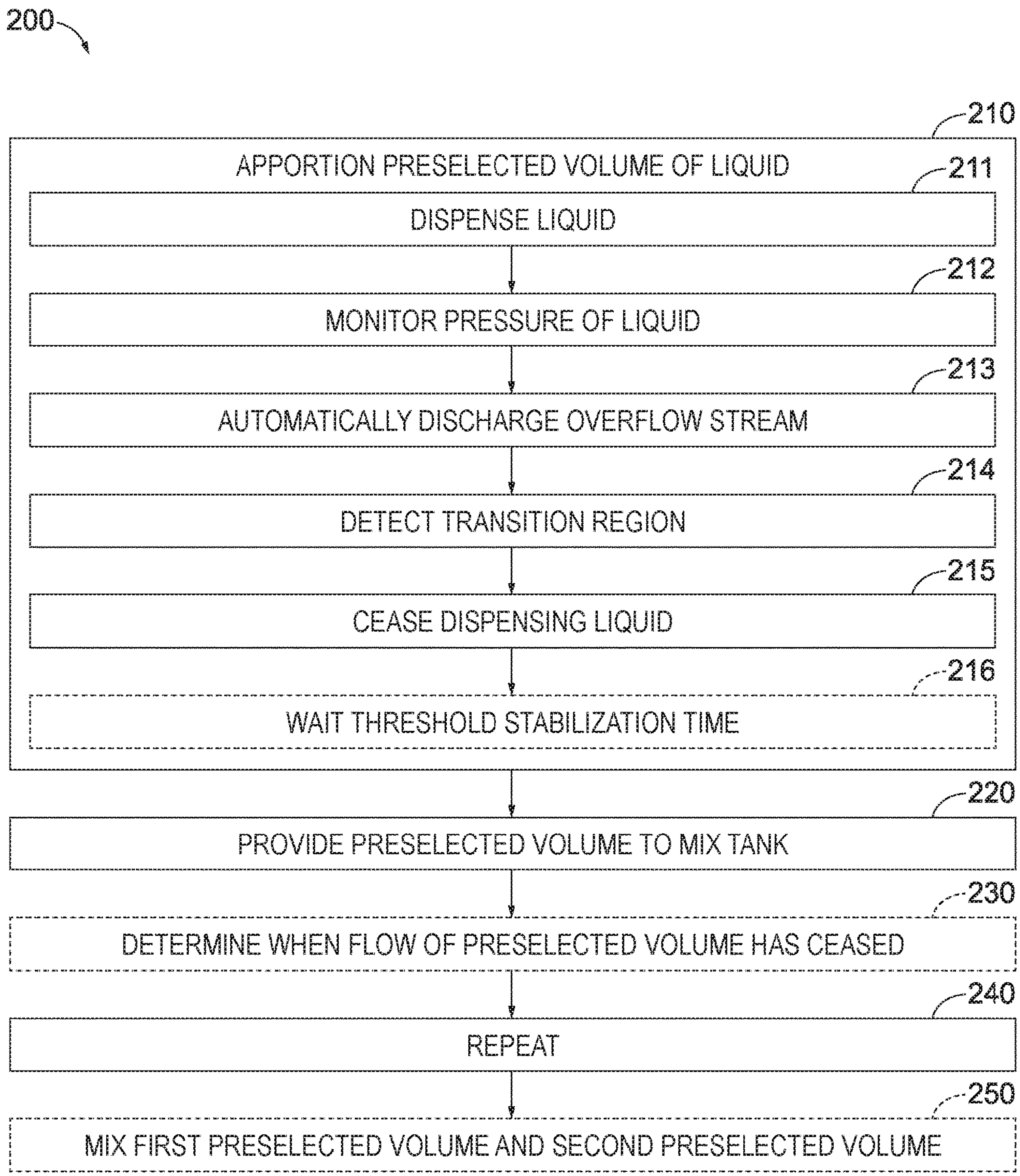
FIG. 5 is a flowchart depicting methods, according to the present disclosure, of mixing a first liquid and a second liquid to form a liquid mixture having a predetermined mix ratio.

FIG. 5 is a flowchart depicting methods 200, according to the present disclosure, of mixing a first liquid and a second liquid to form a liquid mixture having a predetermined mix ratio. Methods 200 include apportioning, at 210, a preselected volume of liquid and providing, at 220, the preselected volume of liquid to a mix tank. Methods 200 may include determining when flow of the preselected volume of liquid has ceased at 230 and include repeating at least a portion of the methods at 240. Methods 200 further may include mixing a first preselected volume of liquid and a second preselected volume of liquid at 250.

As discussed herein with reference to liquid mixing systems 100 of FIGS. 1-3, the systems and methods disclosed herein may be utilized to apportion a first preselected volume of the first liquid and a second preselected volume of the second liquid. The systems and methods disclosed herein further may be utilized to mix the first preselected volume of the first liquid and the second preselected volume of the second liquid to produce and/or generate the liquid mixture. With this in mind, the apportioning at 210 may be utilized to apportion both the first liquid and the second liquid. As an example, and during the apportioning at 210, the liquid may include and/or be the first liquid. The repeating at 240 may include repeating the apportioning at 210; and, during the repeating the apportioning, the liquid may include and/or be the second liquid.

The apportioning at 210 includes apportioning the preselected volume of liquid from a liquid source. The apportioning at 210 includes dispensing the liquid at 211, monitoring a pressure of the liquid at 212, automatically discharging an overflow stream at 213, detecting a transition region at 214, and ceasing dispensing the liquid at 215. The apportioning at 210 also may include waiting a threshold stabilization time at 216.

The dispensing at 211 includes dispensing the liquid from the liquid source and into a containment volume. This may include pumping the liquid from the liquid source and into the containment volume, flowing the liquid from the liquid source into the containment volume, and/or gravity-flowing the liquid from the liquid source and into the containment volume. The dispensing at 211 may include dispensing into a containment structure, such as containment structure 110 of FIGS. 1-3, that forms, defines, and/or at least partially surrounds the containment volume. The dispensing at 211 additionally or alternatively may include dispensing into a lower region of the containment volume.

The monitoring at 212 includes monitoring the pressure of the liquid within the containment volume as a function of time and may be performed during the dispensing at 211. This may include monitoring the pressure within the lower region of the containment volume and/or monitoring via a pressure detection structure, such as a pressure detector and/or a pressure transducer, that extends from a bottom of the containment volume.

The automatically discharging at 213 includes automatically discharging the overflow stream of the liquid from the containment volume. The automatically discharging at 213 may be performed during the dispensing at 211 and/or during the monitoring at 212 and may be responsive to a volume of liquid within the containment volume equaling, or exceeding, the preselected volume.

The discharging at 213 may include discharging the overflow stream from an upper region of the containment volume. The upper region of the containment volume may be vertically above the lower region of the containment volume.

The discharging at 213 may include discharging with, via, and/or utilizing an overflow structure. An example of the overflow structure is illustrated at 140 in FIGS. 1-3. A more specific example of the overflow structure includes an overflow port, such as first overflow port 142 and/or second overflow port 146 of FIGS. 1-3.

The detecting at 214 may include detecting the transition region in the pressure of the liquid within the containment volume as the function of time. The detecting at 214 may be performed during the automatically discharging at 213. The detecting at 214 may include detecting any suitable change and/or transition in the pressure of the liquid within the containment volume as the function of time. As an example, the detecting at 214 may include detecting a slope change in the pressure of the liquid within the containment volume as the function of time. As another example, the detecting at 214 may include detecting a local maxima in the pressure of the liquid within the containment volume as the function of time. As yet another example, the detecting at 214 may include detecting an inflection point in the pressure of the liquid within the containment volume as the function of time. As another example, the detecting at 214 may include detecting a discontinuity in the pressure of the liquid within the containment volume as the function of time. As yet another example, the pressure within the containment volume as the function of time may define a monotonically increasing region, which precedes the transition region. Under these conditions, the detecting at 214 may include detecting that the pressure of the liquid within the containment volume as the function of time is no longer monotonically increasing.

The ceasing at 215 may include ceasing the dispensing at 211 and may be responsive to the detecting at 214. This may include ceasing flow of the liquid from the liquid source and/or into the containment volume.

Waiting the threshold stabilization time at 216 may include waiting any suitable stabilization time and may be subsequent to the ceasing at 215 and/or prior to the providing at 220. This may include waiting to permit the liquid level within the containment volume to stabilize and/or waiting until the automatically discharging at 213 ceases. Examples of the threshold stabilization time include times of at least 0.5 seconds (s), at least 1 s, at least 2 s, at least 5 s, at least 10 s, at least 15 s, at most 60 s, at most 45 s, at most 30 s, at most 20 s, at most 10 s, and/or at most 5 s.

Providing, at 220, the preselected volume of liquid to the mix tank may include providing the preselected volume of liquid to the mix tank in any suitable manner. As an example, the providing at 220 may include pumping the preselected volume of liquid from the containment volume to and/or into the mix tank. As another example, the providing at 220 may include gravity flowing the preselected volume of liquid from the containment volume to and/or into the mix tank. As yet another example, the providing at 220 may include providing with, via, and/or utilizing an outlet structure, such as outlet structure 160 of FIGS. 1-3.

Determining, at 230, when flow of the preselected volume of liquid has ceased may include determining in any suitable manner. As an example, the transition region may be an upper transition region, and the determining at 230 may include detecting a lower transition region in the pressure of the liquid within the containment volume as the function of time. The detecting the lower transition region may include detecting any suitable lower transition region in the pressure of the liquid within the containment volume as the function of time. As an example, the detecting the lower transition region may include detecting a second slope change in the pressure of the liquid within the containment volume as the function of time. As another example, the detecting the lower transition region may include detecting a local minima in the pressure of the liquid within the containment volume as the function of time. As yet another example, the detecting the lower transition region may include detecting a second inflection point in the pressure of the liquid within the containment volume as the function of time. As another example, the detecting the lower transition region may include detecting a second discontinuity in the pressure of the liquid within the containment volume as the function of time. As yet another example, the pressure of the liquid within the containment volume as the function of time may define a monotonically decreasing region. The monotonically decreasing region may follow the upper transition region and/or may be initiated responsive to the providing at 220. Under these conditions, the detecting the lower transition region may include detecting that the pressure within the containment volume as the function of time is no longer monotonically decreasing.

As discussed, during the apportioning at 210, the liquid may include and/or be the first liquid. Under these conditions, the liquid source may include and/or be a first liquid source, the preselected volume may include and/or be the first preselected volume, and the providing at 220 may include providing the first preselected volume to the mix tank. Similarly, the containment volume may include and/or be a first containment volume, the pressure may include and/or be a first pressure, the function of time may include and/or be a first function of time, the volume of the liquid may include and/or be a first volume, the overflow stream may include and/or be a first overflow stream that may flow through a first overflow port, the transition region may include and/or be a first transition region, and/or the threshold stabilization time may include and/or be a first threshold stabilization time.

The repeating at 240 may include repeating at least the apportioning at 210 and the providing at 220 with the second liquid. During the repeating at 240, the liquid may include and/or be the second liquid, the liquid source may include and/or be the second liquid source, the preselected volume may include and/or be the second preselected volume, and the providing at 220 may include providing the second preselected volume to the mix tank, such as to generate the liquid mixture having the predetermined mix ratio. Similarly, the containment volume may include and/or be a second containment volume, the pressure may include and/or be a second pressure, the function of time may include and/or be a second function of time, the volume of the liquid may include and/or be a second volume, the overflow stream may include and/or be a second overflow stream that may flow through a second overflow port, the transition region may include and/or be a second transition region, and/or the threshold stabilization time may include and/or be a second threshold stabilization time.

The first liquid and the second liquid may be different from one another and/or may have differing chemical compositions. Examples of the first liquid and/or of the second liquid include water, a hydrocarbon, an alcohol, and/or methanol. In a more specific example, the first liquid may include and/or be one of methanol and water and the second liquid may include and/or be the other of methanol and water.

The first preselected volume and the second preselected volume may be preselected such that the liquid mixture has and/or defines the predetermined mix ratio. Examples of the predetermined mix ratio include ratios of at least 58 weight percent (wt %) methanol, at least 59 wt % methanol, at least 60 wt % methanol, at least 60.2 wt % methanol, at least 61 wt % methanol, at least 62 wt % methanol, at least 63 wt % methanol, or at least 64 wt % methanol. Additional examples of the predetermined mix ratio include ratios of at most 66 wt % methanol, at most 65 wt % methanol, at most 64 wt % methanol, at most 63.8 wt % methanol, at most 63 wt % methanol, at most 62 wt % methanol, at most 61 wt % methanol, or at most 60 wt % methanol. Additional examples of the predetermined mix ratio include ratios of at least 34 wt % water, at least 35 wt % water, at least 36.2 wt % water, at least 37 wt % water, at least 38 wt % water, at least 39 wt % water, or at least 40 wt % water. Still further examples of the predetermined mix ratio include ratios of at most 42 wt % water, at most 41 wt % water, at most 40 wt % water, at most 39.8 wt % water, at most 39 wt % water, at most 38 wt % water, at most 37 wt % water, or at most 35 wt % water.

Still further examples of the predetermined mix ratio include ratios of at least 66 volume percent (vol %) methanol, at least 67 vol % methanol, at least 68 vol % methanol, at least 68.2 vol % methanol, at least 69 vol % methanol, at least 70 vol % methanol, at least 71 vol % methanol, or at least 72 vol % methanol. Additional examples of the predetermined mix ratio include ratios of at most 74 vol % methanol, at most 73 vol % methanol, at most 72 vol % methanol, at most 71.8 vol % methanol, at most 71 vol % methanol, at most 70 vol % methanol, at most 69 vol % methanol, or at most 68 vol % methanol. Additional examples of the predetermined mix ratio include ratios of at least 26 vol % water, at least 27 vol % water, at least 28 vol % water, at least 28.2 vol % water, at least 29 vol % water, at least 30 vol % water, at least 31 vol % water, or at least 32 vol % water. Still further examples of the predetermined mix ratio include ratios of at most 34 vol % water, at most 33 vol % water, at most 32 vol % water, at most 31.8 vol % water, at most 31 vol % water, at most 30 vol % water, at most 29 vol % water, 28 vol % water, or at most 27 vol % water.

The repeating at 240 also may include repeating the determining at 230. Under these conditions, the determining at 230 may include determining that the flow of the first preselected volume of the first liquid to the mix tank has ceased, and the repeating the determining at 230 may include determining that a flow of the second preselected volume of the second liquid to the mix tank has ceased.

Mixing, at 250, the first preselected volume of liquid and the second preselected volume of liquid may include mixing the first preselected volume of the first liquid with the second preselected volume of the second liquid within the mix tank. This may include mixing in any suitable manner. As an example, the mixing at 250 may be responsive to and/or a result of the providing at 220 and the repeating, at 240, the providing at 220. As another example, the mixing at 250 may include circulating, stirring, and/or otherwise flowing the liquid mixture within the mix tank. As yet another example, the mixing at 250 may include circulating the liquid mixture within a recirculation loop, such as utilizing recirculation system 50 of FIGS. 1-3.

As discussed herein, the systems and methods disclosed herein may utilize a containment structure that includes a single containment body that bounds, defines, and/or at least partially surrounds both the first containment volume and the second containment volume. An example of such a single containment body is illustrated in FIGS. 1-2 at 111. Under these conditions, the first containment volume may be at least partially coextensive with the second containment volume; and the apportioning at 210 and the repeating, at 240, the apportioning at 210 are performed sequentially, or entirely sequentially. For such a configuration, the monitoring at 212 may include monitoring the first pressure with a first pressure detector and the repeating, at 240, the monitoring at 212 may include monitoring the second pressure with the first pressure detector. Stated another way, a single pressure detector, such as pressure detector 151 of FIGS. 1-2, may be utilized for both the monitoring at 212 and the repeating the monitoring at 212.

In addition, the discharging at 213 may include discharging the first overflow stream via the first overflow port, which is associated with the first containment volume, and the repeating, at 240, the discharging at 213 may include discharging the second overflow stream via the second overflow port, which is associated with the second containment volume. The first overflow port and the second overflow port may define different heights within and/or may extend from different regions of the containment body.

As an example, the second overflow port may be positioned vertically above the first overflow port. Under these conditions, and subsequent to the apportioning but prior to the repeating the apportioning, methods 200 further may include closing a first overflow port valve to restrict fluid flow through the first overflow port. As another example, the first overflow port may be positioned vertically above the second overflow port. Under these conditions, and subsequent to the apportioning but prior to the repeating the apportioning, methods 200 further may include closing a second overflow port valve to restrict fluid flow through the second overflow port.

As also discussed herein, the systems and methods disclosed herein may utilize a containment structure that includes two spaced-apart containment bodies, with each containment body bounding, defining, and/or at least partially surrounding a respective one of the first containment volume and the second containment volume. An example of the two spaced-apart containment bodies is illustrated in FIGS. 1 and 3 at 111 and 113, respectively.

Under these conditions, the first containment volume is spaced-apart from the second containment volume; and the apportioning at 210 and the repeating, at 240, the apportioning at 210 may be performed in any desired order, may be performed concurrently, and/or may be performed at least partially concurrently. For such a configuration, the monitoring at 212 may include monitoring the first pressure with a first pressure detector that is associated with the first containment volume and the repeating, at 240, the monitoring at 212 may include monitoring the second pressure with a second pressure detector that is associated with the second containment volume. Stated another way, two separate pressure detectors, such as pressure detectors 151 and 152 of FIGS. 1 and 3, may be utilized for both the monitoring at 212 and the repeating the monitoring at 212.

In addition, the discharging at 213 may include discharging the first overflow stream via the first overflow port, which is associated with the first containment volume, and the repeating, at 240, the discharging at 213 may include discharging the second overflow stream via the second overflow port, which is associated with the second containment volume. The first overflow port and the second overflow port may define different heights within and/or may extend from different regions of the containment body.

As an example, the second overflow port may be positioned vertically above the first overflow port. Under these conditions, and subsequent to the apportioning but prior to the repeating the apportioning, methods 200 further may include closing a first overflow port valve to restrict fluid flow through the first overflow port. As another example, the first overflow port may be positioned vertically above the second overflow port. Under these conditions, and subsequent to the apportioning but prior to the repeating the apportioning, methods 200 further may include closing a second overflow port valve to restrict fluid flow through the second overflow port.

Figure 6:
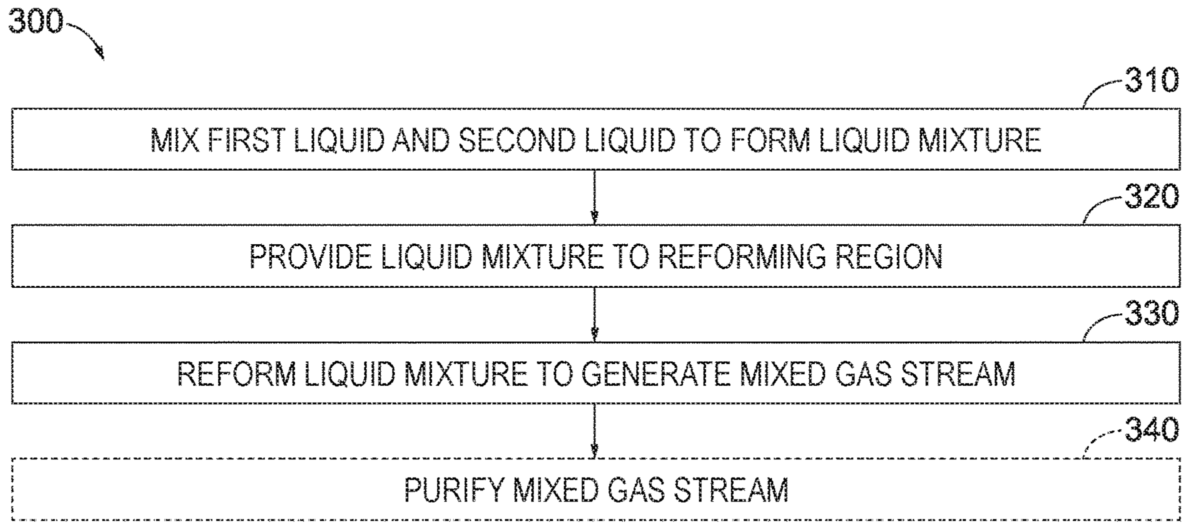
FIG. 6 is a flowchart depicting methods, according to the present disclosure, of producing hydrogen gas.

FIG. 6 is a flowchart depicting methods 300, according to the present disclosure, of producing hydrogen gas. Methods 300 include mixing a first liquid and a second liquid to form a liquid mixture at 310 and providing the liquid mixture to a reforming region at 320. Methods 300 also include reforming the liquid mixture to generate a mixed gas stream at 330 and may include purifying the mixed gas stream at 340.

Mixing the first liquid and the second liquid to form the liquid mixture at 310 may include forming the liquid mixture such that the liquid mixture has and/or defines a predetermined mix ratio. Examples of the predetermined mix ratio are disclosed herein. The mixing at 310 may be performed in any suitable manner. As an example, the mixing at 310 may include mixing with, via, and/or utilizing liquid mixing system 100 of FIGS. 1-3. As another example, the mixing at 310 may include mixing with, via, and/or utilizing any suitable step and/or steps of any of methods 200, which are disclosed herein.

Providing the liquid mixture to the reforming region at 320 may include providing the liquid mixture in any suitable manner. As an example, the providing at 320 may include pumping and/or otherwise flowing the liquid mixture into the reforming region. As another example, the providing at 320 may include heating and/or vaporizing the liquid mixture prior to and/or at least partially concurrently with the providing at 320.

Reforming the liquid mixture to generate the mixed gas stream at 330 may include reforming to generate a mixed gas stream that includes hydrogen gas and other gasses. This may include reforming the liquid mixture in any suitable manner. As examples, the reforming at 330 may include steam reforming and/or autothermal reforming the liquid mixture. Steam reforming may include combining a carbon-containing feedstock (such as methanol or natural gas) and water (in the form of steam), in the presence of a steam reforming catalyst and at elevated temperatures, to produce the mixed gas stream. Steam reforming is an endothermic process that generally requires an external heat source. Autothermal reforming may include combining oxygen, carbon dioxide, and/or steam with a carbon-containing feedstock (such as methane), in the presence of an autothermal reforming catalyst and at elevated temperatures, to generate the mixed gas stream. Autothermal reforming is an exothermic process that generally does not require an external heat source. Examples of the other gasses include carbon monoxide, carbon dioxide, and water.

Purifying the mixed gas stream at 340 may include separating the mixed gas stream into a product hydrogen stream, which included pure, or at least substantially pure, hydrogen gas, and a byproduct stream, which includes the other gasses. The product hydrogen stream thus has a greater concentration of hydrogen gas and/or a lower concentration of the other gasses than the mixed gas stream. The purifying at 340 may be performed in any suitable manner. As examples, the purifying may include purifying with, via, and/or utilizing one or more of a membrane purification assembly and a pressure swing adsorption assembly.

Figure 7:
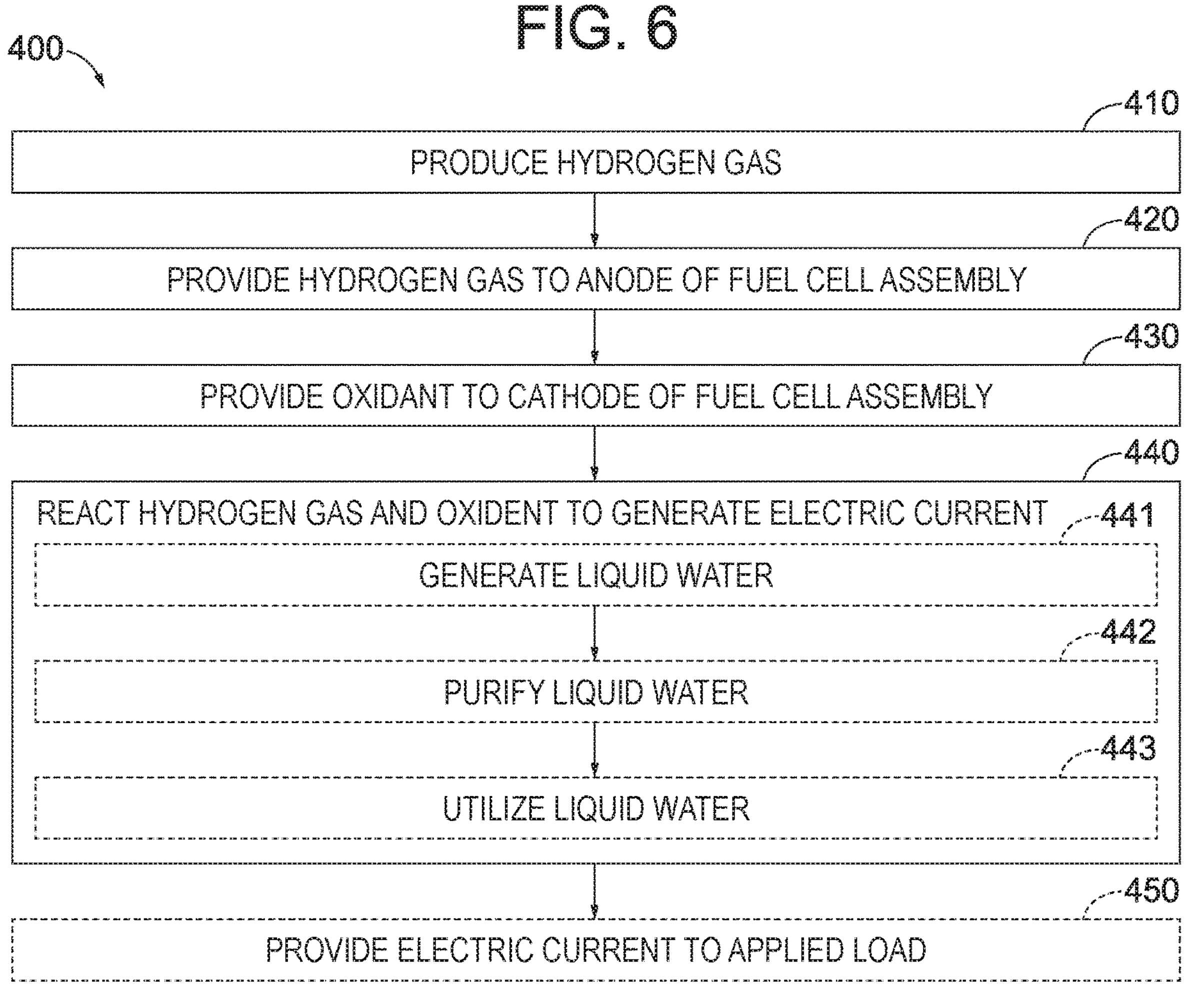
FIG. 7 is a flowchart depicting methods, according to the present disclosure, of operating a fuel cell system.

FIG. 7 is a flowchart depicting methods 400, according to the present disclosure, of operating a fuel cell system. Methods 400 include producing hydrogen gas at 410 and providing the hydrogen gas to an anode of a fuel cell at 420. Methods 400 also include providing an oxidant to a cathode of the fuel cell at 430 and reacting the hydrogen gas and the oxidant to generate an electric current at 440. Methods 400 further may include providing the electric current to an applied load at 450.

Producing hydrogen gas at 410 may include producing the hydrogen gas in any suitable manner. As an example, the producing at 410 may include reforming a feed stream to generate a mixed gas stream that includes the hydrogen gas. As another example, the producing at 410 may include performing any suitable step and/or steps of any of methods 300, which are disclosed herein.

Providing the hydrogen gas to the anode of the fuel cell at 420 may include providing the hydrogen gas, which is produced during the producing at 410, to the anode region of the fuel cell. This may include flowing, pumping, and/or conveying the hydrogen gas, such as under pressure and/or via a pressure differential, from any suitable hydrogen gas source, such as a fuel processor, into fluid contact with the anode of the fuel cell.

Providing the oxidant to the cathode of the fuel cell at 430 may include providing any suitable oxidant to the cathode region of the fuel cell. This may include flowing, pumping, and/or conveying the oxidant into fluid contact with the cathode region of the fuel cell. Examples of the oxidant include oxygen, air, and/or ambient air.

Reacting the hydrogen gas and the oxidant to generate the electric current at 440 may include reacting in any suitable manner. As an example, the fuel cell may include and/or be a polymer electrolyte membrane fuel cell. Under these conditions, the reacting at 440 may include disassociating the hydrogen gas into hydrogen ions and electrons at the anode of the fuel cell, diffusing the hydrogen ions through a polymer electrolyte membrane of the fuel cell, and reacting the hydrogen ions with the oxidant at and/or on the cathode of the fuel cell. The reacting at 440 concurrently may include flowing the electrons, via an external circuit, from the anode of the fuel cell to the cathode of the fuel cell to facilitate the reacting at the cathode of the fuel cell.

As indicated in FIG. 7 at 441, the reacting at 440 may include generating water, or liquid water, at and/or on the cathode of the fuel cell. As an example, the reacting at 440 may include reacting the hydrogen ions with oxygen to generate the water. Under these conditions, methods 400 also may include purifying the water, as indicated at 442 and/or utilizing the water, as indicated at 443.

The purifying at 442 may include purifying in any suitable manner. As an example, the purifying at 442 may include purifying with, via, and/or utilizing a water purifier, such as an ion exchange bed.

The utilizing at 443 may include utilizing the water in any suitable manner. As an example, the utilizing at 443 may include utilizing the water, within methods 200, as the first liquid and/or as the second liquid.

Providing the electric current to the applied load at 450 may include providing the electrons, such as via the external circuit, to any suitable applied load. This may include flowing the electrons from the anode of the fuel cell to the applied load and subsequently flowing the electrons from the applied load to the cathode of the fuel cell.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, “for example,” the phrase, “as an example,” and/or simply the term “example,” when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

Illustrative, non-exclusive examples of systems and methods according to the present disclosure are presented in the following enumerated paragraphs. It is within the scope of the present disclosure that an individual step of a method recited herein, including in the following enumerated paragraphs, may additionally or alternatively be referred to as a “step for” performing the recited action.

A1. A method of mixing a first liquid and a second liquid to form a liquid mixture having a predetermined mix ratio, the method comprising:

apportioning a preselected volume of liquid from a liquid source by:

(i) dispensing the liquid from the liquid source into a containment volume;

(ii) during the dispensing the liquid, monitoring a pressure of the liquid within the containment volume as a function of time;

(iii) during the dispensing the liquid, and when a volume of the liquid within the containment volume is equal to the preselected volume, automatically discharging an overflow stream of the liquid from the containment volume;

(iv) during the discharging the overflow stream, detecting a transition region in the pressure of the liquid within the containment volume as the function of time; and (v) responsive to detecting the transition region, ceasing the dispensing the liquid;

wherein the liquid is the first liquid, the liquid source is a first liquid source, and the preselected volume is a first preselected volume, and further wherein the method includes providing the first preselected volume to a mix tank; and repeating the apportioning, wherein, during the repeating, the liquid is the second liquid, the liquid source is a second liquid source, and the preselected volume is a second preselected volume, and further wherein the method includes providing the second preselected volume of the second liquid to the mix tank to generate the liquid mixture having the predetermined mix ratio.

A2. The method of paragraph A1, wherein, during the apportioning, at least one of:

(i) the containment volume is a first containment volume;

(ii) the pressure is a first pressure;

(iii) the function of time is a first function of time;

(iv) the volume of the liquid is a first volume;

(v) the overflow stream is a first overflow stream; and (vi) the transition region is a first transition region.

A3. The method of any of paragraphs A1-A2, wherein, during the repeating the apportioning, at least one of:

(i) the containment volume is a second containment volume;

(ii) the pressure is a second pressure;

(iii) the function of time is a second function of time;

(iv) the volume of the liquid is a second volume;

(v) the overflow stream is a second overflow stream; and (vi) the transition region is a second transition region.

A4. The method of any of paragraphs A1-A3, wherein the dispensing includes at least one of:

(i) pumping the liquid from the liquid source and into the containment volume; and (ii) gravity-flowing the liquid from the liquid source and into the containment volume.

A5. The method of any of paragraphs A1-A4, wherein the dispensing includes flowing a liquid stream from the liquid source into the containment volume.

A6. The method of any of paragraphs A1-A5, wherein the dispensing includes dispensing into a containment structure that defines the containment volume.

A7. The method of any of paragraphs A1-A6, wherein the dispensing includes dispensing into a lower region of the containment volume.

A8. The method of any of paragraphs A1-A7, wherein at least one of:

(i) during the apportioning, the containment volume is a/the first containment volume;

(ii) during the repeating the apportioning, the containment volume is a/the second containment volume, which is at least partially coextensive with the first containment volume; and (iii) during the repeating the apportioning, the containment volume is the second containment volume, which is spaced-apart from the first containment volume.

A9. The method of any of paragraphs A1-A8, wherein the monitoring the pressure includes monitoring the pressure within a lower region of the containment volume.

A10. The method of any of paragraphs A1-A9, wherein the monitoring the pressure includes monitoring the pressure via a pressure detection structure that extends from a bottom of the containment volume.

A11. The method of paragraph A10, wherein the pressure detection structure includes a pressure detector.

A12. The method of any of paragraphs A1-A11, wherein at least one of:

(i) during the apportioning, the monitoring includes monitoring with a first pressure detector;

(ii) during the repeating the apportioning, the monitoring includes monitoring with the first pressure detector; and (iii) during the repeating the apportioning, the monitoring includes monitoring with a second pressure detector that is distinct from the first pressure detector.

A13. The method of any of paragraphs A1-A12, wherein the discharging the overflow stream includes discharging the overflow stream from an upper region of the containment volume.

A14. The method of paragraph A13, wherein the upper region of the containment volume is vertically above a lower region of the containment volume within which the monitoring is performed.

A15. The method of any of paragraphs A1-A14, wherein the discharging the overflow stream includes discharging with an overflow structure.

A16. The method of any of paragraphs A1-A15, wherein the discharging includes discharging via an overflow port, optionally wherein at least one of:

(i) during the apportioning, the overflow port is a first overflow port; and (ii) during the repeating the apportioning, the overflow port is a second overflow port that is at least one of spaced-apart from the first overflow port and distinct from the first overflow port.

A17. The method of any of paragraphs A1-A16, wherein at least one of:

(i) the detecting the transition region includes detecting a slope change in the pressure of the liquid within the containment volume as the function of time;

(ii) the detecting the transition region includes detecting a local maxima in the pressure of the liquid within the containment volume as the function of time;

(iii) the detecting the transition region includes detecting an inflection point in the pressure of the liquid within the containment volume as the function of time;

(iv) wherein the pressure of the liquid within the containment volume as the function of time defines a monotonically increasing region, which precedes the transition region, and further wherein the detecting the transition region includes detecting that the pressure of the liquid within the containment volume as the function of time is no longer monotonically increasing;

(v) the detecting the transition region includes detecting a discontinuity in the pressure of the liquid within the containment volume as the function of time.

A18. The method of any of paragraphs A1-A17, wherein the ceasing the dispensing the liquid includes ceasing flow of the liquid from the liquid source into the containment volume.

A19. The method of any of paragraphs A1-A18, wherein, subsequent to the ceasing the dispensing the liquid and prior to the providing the first preselected volume to the mix tank, the method further includes waiting a first threshold stabilization time.

A20. The method of any of paragraphs A1-A19, wherein, subsequent to the ceasing the dispensing the liquid and prior to the providing the second preselected volume to the mix tank, the method further includes waiting a second threshold stabilization time.

A21. The method of any of paragraphs A19-A20, wherein the waiting includes waiting to permit a liquid level within the containment volume to stabilize.

A22. The method of any of paragraphs A19-A21, wherein the waiting includes waiting until the discharging ceases, or at least substantially ceases.

A23. The method of any of paragraphs A19-A22, wherein the threshold stabilization time includes at least one of at least 0.5 seconds (s), at least 1 s, at least 2 s, at least 5 s, at least 10 s, at least 15 s, at most 60 s, at most 45 s, at most 30 s, at most 20 s, at most 10 s, and at most 5 s.

A24. The method of any of paragraphs A1-A23, wherein the method further includes mixing the first preselected volume of the first liquid and the second preselected volume of the second liquid within the mix tank.

A25. The method of paragraph A24, wherein the mixing includes circulating the liquid mixture within the mix tank.

A26. The method of paragraph A25, wherein the circulating includes circulating with a recirculation loop.

A27. The method of any of paragraphs A1-A26, wherein at least one of the first liquid and the second liquid includes at least one of:

(i) water;

(ii) a hydrocarbon;

(iii) an alcohol; and (iv) methanol.

A28. The method of any of paragraphs A1-A27, wherein the first liquid includes, or is, one of methanol and water, and further wherein the second liquid includes, or is, the other of methanol and water.

A29. The method of paragraph A28, wherein the predetermined mix ratio includes at least one of:

(i) at least 58 weight percent (wt %) methanol, at least 59 wt % methanol, at least 60 wt % methanol, at least 60.2 wt % methanol, at least 61 wt % methanol, at least 62 wt % methanol, at least 63 wt % methanol, or at least 64 wt % methanol;

(ii) at most 66 wt % methanol, at most 65 wt % methanol, at most 64 wt % methanol, at most 63.8 wt % methanol, at most 63 wt % methanol, at most 62 wt % methanol, at most 61 wt % methanol, or at most 60 wt % methanol;

(iii) at least 34 wt % water, at least 35 wt % water, at least 36.2 wt % water, at least 37 wt % water, at least 38 wt % water, at least 39 wt % water, or at least 40 wt % water; and (iv) at most 42 wt % water, at most 41 wt % water, at most 40 wt % water, at most 39.8 wt % water, at most 39 wt % water, at most 38 wt % water, at most 37 wt % water, or at most 35 wt % water.

A29.1 The method of any of paragraphs A28-A29, wherein the predetermined mix ratio includes at least one of:

(i) at least 66 volume percent (vol %) at least 67 vol % methanol, at least 68 vol % methanol, at least 68.2 vol % methanol, at least 69 vol % methanol, at least 70 vol % methanol, at least 71 vol % methanol, or at least 72 vol % methanol;

(ii) at most 74 vol % methanol, at most 73 vol % methanol, at most 72 vol % methanol, at most 71.8 vol % methanol, at most 71 vol % methanol, at most 70 vol % methanol, at most 69 vol % methanol, or at most 68 vol % methanol;

(iii) at least 26 vol % water, at least 27 vol % water, at least 28 vol % water, at least 28.2 vol % water, at least 29 vol % water, at least 30 vol % water, at least 31 vol % water, or at least 32 vol % water; and (iv) at most 34 vol % water, at most 33 vol % water, at most 32 vol % water, at most 31.8 vol % water, at most 31 vol % water, at most 30 vol % water, at most 29 vol % water, 28 vol % water, or at most 27 vol % water.

A30. The method of any of paragraphs A1-A29.1, wherein the method further includes determining that a flow of the first preselected volume to the mix tank has ceased.

A31. The method of any of paragraphs A1-A30, wherein the method further includes determining that a flow of the second preselected volume to the mix tank has ceased.

A32. The method of paragraph A31, wherein the transition region is an upper transition region, and further wherein at least one of the determining that the flow of the first preselected volume of the first liquid to the mix tank has ceased and the determining that the flow of the second preselected volume of the second liquid to the mix tank has ceased includes detecting a lower transition region in the pressure of the liquid within the containment volume as the function of time.

A33. The method of paragraph A32, wherein at least one of:

(i) the detecting the lower transition region includes detecting a second slope change in the pressure of the liquid within the containment volume as the function of time;

(ii) the detecting the lower transition region includes detecting a local minima in the pressure of the liquid within the containment volume as the function of time;

(iii) the detecting the lower transition region includes detecting a second inflection point in the pressure of the liquid within the containment volume as the function of time;

(iv) wherein the pressure of the liquid within the containment volume as the function of time defines a monotonically decreasing region, which follows the first transition region, and further wherein the detecting the lower transition region includes detecting that the pressure of the liquid within the containment volume as the function of time is no longer monotonically decreasing;

(v) the detecting the lower transition region includes detecting a second discontinuity in the pressure of the liquid within the containment volume as the function of time.

A34. The method of any of paragraphs A1-A33, wherein, during the apportioning, the containment volume is a/the first containment volume, wherein, during the repeating the apportioning, the containment volume is a/the second containment volume, and further wherein the second containment volume is at least partially coextensive with the first containment volume.

A35. The method of paragraph A34, wherein:

(i) during the apportioning, the discharging includes discharging a/the first overflow stream via a/the first overflow port associated with the first containment volume; and (ii) during the repeating the apportioning, the discharging includes discharging a/the second overflow stream via a/the second overflow port associated with the second containment volume.

A36. The method of paragraph A35, wherein at least one of:

(i) the second overflow port is positioned vertically above the first overflow port, and further wherein, subsequent to the apportioning and prior to the repeating the apportioning, the method further includes closing a first overflow port valve to restrict fluid flow through the first overflow port; and (ii) the first overflow port is positioned vertically above the second overflow port, and further wherein, subsequent to the apportioning and prior to the repeating the apportioning, the method further includes opening a second overflow port valve to permit fluid flow through the second overflow port.

A37. The method of any of paragraphs A1-A36, wherein the apportioning and the repeating the apportioning are performed entirely sequentially.

A38. The method of any of paragraphs A1-A37, wherein, during the apportioning, the containment volume is a/the first containment volume, wherein, during the repeating the apportioning, the containment volume is a/the second containment volume, and further wherein the second containment volume is spaced-apart from the first containment volume.

A39. The method of paragraph A38, wherein the apportioning and the repeating the apportioning are performed at least partially concurrently.

A40. The method of any of paragraphs A1-A39, wherein the containment volume is at least one of:

(i) an elongate containment volume; and (ii) a cylindrical containment volume.

A41. The method of any of paragraphs A1-A40, wherein the containment volume defines a height and a maximum horizontal extent, which is measured perpendicular to the height, and further wherein a ratio of the height to the maximum horizontal extent is at least one of at least 2, at least 4, at least 6, at least 8, at least 10, at most 30, at most 25, at most 20, at most 15, at most 10, and at most 5.

A42. The method of paragraph A41, wherein the maximum horizontal extent of the containment volume is at least 4 centimeters (cm), at least 6 cm, at least 8 cm, at least 10 cm, at least 12 cm, at least 14 cm, at least 16 cm, at most 30 cm, at most 25 cm, at most 20 cm, at most 18 cm, at most 16 cm, at most 14 cm, at most 12 cm, and at most 10 cm.

B1. A method of producing hydrogen gas, the method comprising:

mixing a first liquid and a second liquid, utilizing the method of any of claims A1-A42, to form a liquid mixture having a predetermined mix ratio;

providing the liquid mixture to a reforming region; and reforming the liquid mixture to generate a mixed gas stream that includes hydrogen gas and other gasses.

B2. The method of paragraph B1, wherein the reforming includes at least one of steam reforming and autothermal reforming.

B3. The method of any of paragraphs B1-B2, wherein the method further includes purifying the mixed gas stream to generate a product hydrogen stream, which includes at least substantially pure hydrogen gas, and a byproduct stream, which includes the other gasses.

B4. The method of paragraph B3, wherein the purifying includes at least one of:

(i) purifying with a membrane purification assembly; and (ii) purifying with a pressure swing adsorption assembly.

C1. A method of operating a fuel cell system, the method comprising:

producing hydrogen gas utilizing the method of any of paragraphs B1-B4;

providing the hydrogen gas to an anode of a fuel cell assembly;

providing an oxidant to a cathode of the fuel cell assembly; and reacting the hydrogen gas and the oxidant, within the fuel cell assembly, to generate an electric current.

C2. The method of paragraph C1, wherein the method further includes providing the electric current to an applied load.

C3. The method of any of paragraphs C1-C2, wherein the reacting includes generating liquid water, and further wherein the method includes utilizing the liquid water as one of the first liquid and the second liquid.

C4. The method of paragraph C3, wherein the method further includes purifying the liquid water prior to utilizing the liquid water.

C5. The method of paragraph C4, wherein the purifying includes purifying in an ion exchange bed.

D1. A liquid mixing system configured to mix a first liquid and a second liquid at a predetermined mix ratio, the system comprising:

a containment structure defining:

(i) a first containment volume configured to receive the first liquid; and (ii) a second containment volume configured to receive the second liquid;

an overflow structure including:

(i) a first overflow port extending from the first containment volume and positioned to emit a first overflow stream from the first containment volume when a first liquid volume of the first liquid within the first containment volume equals a first preselected volume;

(ii) a second overflow port extending from the second containment volume and positioned to emit a second overflow stream from the second containment volume when a second liquid volume of the second liquid within the second containment volume equals a second preselected volume;

a pressure detection structure configured to:

(i) measure a first pressure of the first liquid as a function of time within the first containment volume; and (ii) measure a second pressure of the second liquid as a function of time within the second containment volume;

a mix tank configured to receive and to mix the first preselected volume of the first liquid and the second preselected volume of the second liquid to form a liquid mixture at the predetermined mix ratio;

an outlet structure configured to selectively provide:

(i) the first preselected volume of the first liquid to the mix tank; and (ii) the second preselected volume of the second liquid to the mix tank; and a controller programmed to control the mixing system according to the method of any of paragraphs A1-A42.

D2. The system of paragraph D1, wherein the system further includes a fuel processor configured to receive the liquid mixture and to generate a mixed gas stream that includes hydrogen gas and other gasses.

D3. The system of paragraph D2, wherein the fuel processor includes at least one of a reformer, an autothermal reformer, and a steam reformer.

D4. The system of any of paragraphs D2-D3, wherein the system further includes a purification assembly configured to separate the mixed gas stream into a product hydrogen stream, which includes at least substantially pure hydrogen gas, and a byproduct stream, which includes the other gasses.

D5. The system of paragraph D4, wherein the purification assembly includes at least one of a membrane purification assembly and a pressure swing adsorption assembly.

D6. The system of any of paragraphs D4-D5, wherein the system further includes a fuel cell configured to receive the hydrogen gas and to generate an electric current therefrom.

E1. Non-transitory computer-readable storage media including computer-executable instructions that, when executed, direct a mixing system to perform the method of any of paragraphs A1-A42.

F1. A mixing system configured to mix a first liquid and a second liquid at a predetermined mix ratio, the system comprising:

a controller programmed to perform the method of any of paragraphs A1-A42; and any suitable structure of any of paragraphs A1-A42.

INDUSTRIAL APPLICABILITY

The systems and methods disclosed herein are applicable to the liquid mixing, fuel processing, fuel cell, and related industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method of operating a fuel cell system, the method comprising:

mixing a first liquid and a second liquid to form a liquid mixture having a predetermined mix ratio, wherein the mixing includes apportioning a preselected volume of liquid from a liquid source by:

(i) dispensing of the liquid from the liquid source into a containment volume;

(ii) during the dispensing of the liquid, monitoring a pressure of the liquid within the containment volume as a function of time;

(iii) during the dispensing of the liquid, automatically discharging of an overflow stream of the liquid from the containment volume, wherein, during the automatically discharging, a volume of the liquid within the containment volume is equal to the preselected volume;

(iv) during the discharging of the overflow stream, detecting a transition region in the pressure of the liquid within the containment volume as the function of time; and (v) responsive to detecting the transition region, ceasing the dispensing of the liquid, wherein the liquid is the first liquid, the liquid source is a first liquid source, and the preselected volume is a first preselected volume of the first liquid, and further wherein the mixing includes providing the first preselected volume of the first liquid to a mix tank;

wherein the mixing includes repeating the apportioning, wherein, during the repeating, the liquid is the second liquid, the liquid source is a second liquid source, and the preselected volume is a second preselected volume of the second liquid, wherein the method includes providing the second preselected volume of the second liquid to the mix tank to generate the liquid mixture having the predetermined mix ratio, wherein the first liquid is one of methanol and water, and further wherein the second liquid is the other of methanol and water;

providing the liquid mixture to a reforming region;

reforming the liquid mixture to generate a mixed gas stream that includes hydrogen gas and other gasses;

providing the hydrogen gas to an anode of a fuel cell assembly;

providing an oxidant to a cathode of the fuel cell assembly; and reacting the hydrogen gas and the oxidant, within the fuel cell assembly, to generate an electric current.

2. The method of claim 1, wherein, during the apportioning, the containment volume is a first containment volume, wherein, during the repeating the apportioning, the containment volume is a second containment volume, and further wherein the second containment volume is at least partially coextensive with the first containment volume.

3. The method of claim 2, wherein:

(i) during the apportioning, the discharging includes discharging a first overflow stream via a first overflow port associated with the first containment volume; and (ii) during the repeating the apportioning, the discharging includes discharging a second overflow stream via a second overflow port associated with the second containment volume.

4. The method of claim 3, wherein one of:

(i) the second overflow port is positioned vertically above the first overflow port, and further wherein, subsequent to the apportioning and prior to the repeating the apportioning, the method further includes closing a first overflow port valve to restrict fluid flow through the first overflow port; and (ii) the first overflow port is positioned vertically above the second overflow port, and further wherein, subsequent to the apportioning and prior to the repeating the apportioning, the method further includes opening a second overflow port valve to permit fluid flow through the second overflow port.

5. The method of claim 1, wherein the apportioning and the repeating the apportioning are performed entirely sequentially.

6. The method of claim 1, wherein, during the apportioning, the containment volume is a first containment volume, wherein, during the repeating the apportioning, the containment volume is a second containment volume, and further wherein the second containment volume is spaced-apart from the first containment volume.

7. The method of claim 1, wherein the apportioning and the repeating the apportioning are performed at least partially concurrently.

8. The method of claim 1, wherein the discharging of the overflow stream includes discharging of the overflow stream from an upper region of the containment volume, wherein the upper region of the containment volume is vertically above a lower region of the containment volume within which the monitoring is performed.

9. The method of claim 1, wherein at least one of:

(i) the detecting the transition region includes detecting a slope change in the pressure of the liquid within the containment volume as the function of time;

(ii) the detecting the transition region includes detecting a local maxima in the pressure of the liquid within the containment volume as the function of time;

(iii) the detecting the transition region includes detecting an inflection point in the pressure of the liquid within the containment volume as the function of time;

(iv) wherein the pressure of the liquid within the containment volume as the function of time defines a monotonically increasing region, which precedes the transition region, and further wherein the detecting the transition region includes detecting that the pressure of the liquid within the containment volume as the function of time is no longer monotonically increasing;

(v) the detecting the transition region includes detecting a discontinuity in the pressure of the liquid within the containment volume as the function of time.

10. The method of claim 1, wherein, subsequent to the ceasing the dispensing of the liquid and prior to the providing the first preselected volume of the first liquid to the mix tank, the method further includes waiting a first threshold stabilization time, wherein the waiting includes waiting until the discharging at least substantially ceases.

11. The method of claim 1, wherein the predetermined mix ratio includes at least 66 weight percent (wt %) methanol and at most 74 wt % methanol, and further wherein the predetermined mix ratio includes at least 26 wt % water and at most 34 wt % water.

12. The method of claim 1, wherein the method further includes:

(i) determining that a flow of the first preselected volume of the first liquid to the mix tank has ceased; and (ii) determining that a flow of the second preselected volume of the second liquid to the mix tank has ceased.

13. The method of claim 12, wherein the transition region is an upper transition region, and further wherein at least one of the determining that the flow of the first preselected volume of the first liquid to the mix tank has ceased and the determining that the flow of the second preselected volume of the second liquid to the mix tank has ceased includes detecting a lower transition region in the pressure of the liquid within the containment volume as the function of time.

14. A method of mixing a first liquid and a second liquid to form a liquid mixture having a predetermined mix ratio, the method comprising:

apportioning a preselected volume of liquid from a liquid source by:

(i) dispensing of the liquid from the liquid source into a containment volume;

(ii) during the dispensing of the liquid, monitoring a pressure of the liquid within the containment volume as a function of time;

(iii) during the dispensing of the liquid, and when a volume of the liquid within the containment volume is equal to the preselected volume, automatically discharging of an overflow stream of the liquid from the containment volume;

(iv) during the discharging of the overflow stream, detecting a transition region in the pressure of the liquid within the containment volume as the function of time; and (v) responsive to detecting the transition region, ceasing the dispensing of the liquid;

wherein the liquid is the first liquid, the liquid source is a first liquid source, and the preselected volume is a first preselected volume, and further wherein the method includes providing the first preselected volume to a mix tank; and repeating the apportioning, wherein, during the repeating, the liquid is the second liquid, the liquid source is a second liquid source, and the preselected volume is a second preselected volume, and further wherein the method includes providing the second preselected volume of the second liquid to the mix tank to generate the liquid mixture having the predetermined mix ratio.

15. The method of claim 14, wherein, during the apportioning, the containment volume is a first containment volume, wherein, during the repeating the apportioning, the containment volume is a second containment volume, and further wherein one of:

(i) the second containment volume is at least partially coextensive with the first containment volume; and (ii) the second containment volume is spaced-apart from the first containment volume.

16. The method of claim 14, wherein during the apportioning, the monitoring includes monitoring with a first pressure detector, and further wherein, at least one of:
(i) during the repeating the apportioning, the monitoring includes monitoring with the first pressure detector; and
(ii) during the repeating the apportioning, the monitoring includes monitoring with a second pressure detector that is distinct from the first pressure detector.

17. The method of claim 14, wherein the discharging includes discharging via an overflow port, wherein:
(i) during the apportioning, the overflow port is a first overflow port; and
(ii) during the repeating the apportioning, the overflow port is a second overflow port that is spaced-apart from the first overflow port.

18. The method of claim 14, wherein at least one of:
(i) the detecting the transition region includes detecting a slope change in the pressure of the liquid within the containment volume as the function of time;
(ii) the detecting the transition region includes detecting a local maxima in the pressure of the liquid within the containment volume as the function of time;
(iii) the detecting the transition region includes detecting an inflection point in the pressure of the liquid within the containment volume as the function of time;
(iv) wherein the pressure of the liquid within the containment volume as the function of time defines a monotonically increasing region, which precedes the transition region, and further wherein the detecting the transition region includes detecting that the pressure of the liquid within the containment volume as the function of time is no longer monotonically increasing;
(v) the detecting the transition region includes detecting a discontinuity in the pressure of the liquid within the containment volume as the function of time.

19. The method of claim 14, wherein the method further includes:
(i) determining that a flow of the first preselected volume to the mix tank has ceased; and
(ii) determining that a flow of the second preselected volume to the mix tank has ceased.

20. A liquid mixing system configured to mix a first liquid and a second liquid at a predetermined mix ratio, the system comprising:
a containment structure defining:
(i) a first containment volume configured to receive the first liquid; and
(ii) a second containment volume configured to receive the second liquid;
an overflow structure including:
(i) a first overflow port extending from the first containment volume and positioned to emit a first overflow stream from the first containment volume when a first liquid volume of the first liquid within the first containment volume equals a first preselected volume;
(ii) a second overflow port extending from the second containment volume and positioned to emit a second overflow stream from the second containment volume when a second liquid volume of the second liquid within the second containment volume equals a second preselected volume;
a pressure detection structure configured to:
(i) measure a first pressure of the first liquid as a function of time within the first containment volume; and
(ii) measure a second pressure of the second liquid as a function of time within the second containment volume;
a mix tank configured to receive and to mix the first preselected volume of the first liquid and the second preselected volume of the second liquid to form a liquid mixture at the predetermined mix ratio;
an outlet structure configured to selectively provide:
(i) the first preselected volume of the first liquid to the mix tank; and
(ii) the second preselected volume of the second liquid to the mix tank; and
a controller programmed to control the mixing system according to the method of claim 14.

21. The system of claim 20, wherein the system further includes a fuel processor configured to receive the liquid mixture and to generate a mixed gas stream that includes hydrogen gas and other gasses.

22. The system of claim 21, wherein the system further includes a purification assembly configured to separate the mixed gas stream into a product hydrogen stream, which includes at least substantially pure hydrogen gas, and a byproduct stream, which includes the other gasses.

23. The system of claim 22, wherein the system further includes a fuel cell configured to receive the hydrogen gas and to generate an electric current therefrom.

24. Non-transitory computer-readable storage media including computer-executable instructions that, when executed, direct a mixing system to perform the method of claim 14.

* * * * *